US012650137B2

(12) United States Patent (10) Patent No.: US 12,650,137 B2

Veliz Gonzalez (45) Date of Patent: Jun. 9, 2026

(54) METHOD AND APPLICATION FOR ELIMINATING GASEOUS CAVITATION

(71) Applicant: Jose Antonio Veliz Gonzalez, Nuevo Leon (MX)

(72) Inventor: Jose Antonio Veliz Gonzalez, Nuevo Leon (MX)

( * ) Notice: Subject to any disclaimer, the term of this patent is extended or adjusted under 35 U.S.C. 154(b) by 232 days.

(21) Appl. No.: 18/579,527

(22) PCT Filed: Jun. 17, 2022

(86) PCT No.: PCT/MX2022/050052

§ 371 (c)(1),
(2) Date: Jan. 16, 2024

(87) PCT Pub. No.: WO2023/287272

PCT Pub. Date: Jan. 19, 2023

(65) Prior Publication Data

US 2024/0318675 A1 Sep. 26, 2024

(30) Foreign Application Priority Data

Jul. 16, 2021 (MX) .................. MX/A/2021/008659

(51) Int. Cl.
F15B 19/00 (2006.01)
B62D 5/18 (2006.01)
F15B 21/00 (2006.01)

(52) U.S. Cl.
CPC ................ F15B 19/00 (2013.01); B62D 5/18 (2013.01); F15B 21/008 (2013.01)

(58) Field of Classification Search
CPC ...... F15B 19/00; F15B 21/008; F15B 19/002; F15B 21/087; F15B 2211/855; F15B 2211/8609; F15B 2211/8616; F15B 21/047; B62D 5/18; B62D 5/06; F04B 51/00; F04D 29/66
See application file for complete search history.

(56) References Cited

U.S. PATENT DOCUMENTS

| | | | | |
|---|---|---|---|---|
| 6,470,247 | B1 * | 10/2002 | Meyer ................... | F15B 19/005 |
| | | | | 701/33.9 |
| 6,663,349 | B1 | 12/2003 | Discenzo | |
| 10,581,974 | B2 | 3/2020 | Sustaeta et al. | |
| 10,919,565 | B2 | 2/2021 | Cho | |
| 2006/0008356 | A1 * | 1/2006 | Smith ................... | F15B 21/047 |
| | | | | 417/151 |
| 2006/0162439 | A1 * | 7/2006 | Du ........................ | F15B 19/005 |
| | | | | 73/168 |

(Continued)

FOREIGN PATENT DOCUMENTS

| | | |
|---|---|---|
| EP | 0206119 | 12/1986 |
| KR | 1969284 | 4/2019 |

(Continued)

*Primary Examiner* — David J Bolduc

(74) *Attorney, Agent, or Firm* — Defillo & Associates, Inc; Evelyn A. Defillo

(57) ABSTRACT

A method and application for eliminating gaseous cavitation. The method allows for the determination of the types of problems that cause cavitation, such as RPM, temperature, differential pressure and flow rate, as well as the application of possible techniques for the permanent solution of gaseous cavitation in the power steering system in heavy-duty vehicles.

6 Claims, 12 Drawing Sheets

(56)    References Cited

U.S. PATENT DOCUMENTS

| | | | | |
|---|---|---|---|---|
| 2013/0298542 A1* | 11/2013 | Lowman | ................. | F15B 15/18 |
| | | | | 137/511 |
| 2016/0090997 A1* | 3/2016 | Johnson | ................ | E02F 9/2267 |
| | | | | 137/599.11 |
| 2018/0058443 A1 | 3/2018 | Doy | | |
| 2020/0079483 A1* | 3/2020 | Pashley | .................... | B63H 1/18 |
| 2021/0018021 A1* | 1/2021 | Fuchs | ........................ | F15B 1/04 |
| 2021/0396223 A1* | 12/2021 | Yeung | ................... | G01L 5/0071 |
| 2023/0022750 A1* | 1/2023 | Varadharajan | .......... | F15B 11/16 |

FOREIGN PATENT DOCUMENTS

| | | |
|---|---|---|
| KR | 2019123098 | 10/2019 |
| WO | WO2011133849 | 10/2011 |
| WO | WO2012118564 | 9/2012 |

* cited by examiner

METHOD AND APPLICATION FOR ELIMINATING GASEOUS CAVITATION

CROSS REFERENCE TO RELATED APPLICATION

This application is a National Stage Entry of PCT/MX2022/050052 filed Jun. 17, 2022, under the International Convention and claiming priority over Mexican Patent Application No. MX/a/2021/008659 filed Jul. 16, 2021.

FIELD OF THE INVENTION

The present invention relates to a method and application for eliminating gaseous cavitation. More specifically to a method that allows the determination of problems that cause cavitation.

OBJECTIVE OF THE INVENTION

The objective of this invention is to eliminate the gaseous cavitation in power steering in heavy duty vehicles with dual hydraulic steering gearbox, which cause noise, vibration, fluid degradation, (e.g., molecular decomposition of oil) and presence of the gases in the hydraulic system. This method is used to determine the maximum of what revolutions per minute (RPM) the hydraulic pump can operate at to eliminate any gaseous cavitation problems in the hydraulic steering system. The solution consists of the implementation of specific methodologies and the application of various techniques described below; this innovation modifies the current performance and permanently solves the noise and poor performance problems of the hydraulic steering system in heavy duty vehicles. The decrease in bomb RPM will cause a reduction in the flow rate of fluid (e.g., oil) in the hydraulic system, causing the differential pressure in the hydraulic pump to decrease; this way, the hydraulic system will operate at a differential pressure without gaseous cavitation, preventing the pressure drop across the pump from reaching the temperature-pressure saturation curve of the non-condensable gases in the hydraulic fluid (e.g. oil).

The main application and target market for this invention is heavy duty vehicles with dual hydraulic steering gearbox that have had problems for years and have not been addressed and solved. Most, if not all, heavy-duty vehicles with dual steering gearbox are in the heavy-duty vehicles vocational market.

This invention has the competitive advantage of eliminating the following problems that currently exist in the market of heavy-duty vehicles with dual steering gearboxes:

Noises in the hydraulic steering.

Steering wheel and hydraulic system vibrations.

Degradation of the power steering fluid (e.g., oil).

Presence of gases in the hydraulic steering system.

Currently, the recommended power steering oil for use in heavy duty vehicles is a synthetic oil, however, synthetic oil causes gaseous cavitation in the hydraulic steering system. Users are therefore forced to continue using the considered old technology oil alternatives, as they are mineral oils (e.g., SAE standard oil:15W40) and there are problems with working at a low temperature. This is very noticeable during the winter in North America at temperatures below −20° (minus twenty degrees Celsius). Another advantage is the elimination of production lines, rework, or manual gases purging process in the hydraulic steering system (caused by gaseous cavitation) which is performed on all new units in the production plants of heavy-duty vehicles with dual hydraulic steering gearbox before the delivery to the customer.

BACKGROUND OF THE INVENTION

The above describes the current problems and evidence that happened because the gaseous cavitation phenomenon was not understood, mainly because of its low occurrence and what increases its complexity is that these mechanisms depend on internal combustion engines where both the fluid temperature and RPM of the pump of the hydraulic system are not constant and have operating ranges. This makes more difficult to understand the problem, because it appears suddenly and without any apparent cause. The presence of this phenomenon has increased due to the use of new generation oils, such as the synthetic ones, which have a better performance at low temperatures and with which this type of problem is therefore more common.

Currently, the market of heavy-duty vehicle with dual hydraulic steering gearbox solve the problem by manually purging the gases from the system, but this process does not completely eliminate the gases, noises, or vibrations, and the fluid undergoes a degradation process. The result is a poor system performance and until now there has been no method, technique or invention that permanently solves that problem.

Analyzing the state of the art (the state of the techniques), similar problems have been detected but in other automobile and/or tractor trailers, however there are no equal or similar innovations that precisely solve this gaseous cavitation problem, the following innovations are listed below:

The document U.S. Ser. No. 10/919,565B2 relates to a noise reducing structure of an electronic power steering device including a worm shaft rotated by a motor to a worm wheel coupled to the worm shaft and rotating a steering shaft, and a housing surrounding the worm shaft including a cylindrical damper unit formed as an elastic member, an inner side of the cylindrical damper unit for absorbing an impact transmitted to the worm shaft and rotatably connected to the worm shaft, a rubber support coupled to a semi-cylindrical damper support formed on a side surface of the damper unit for closing contact between the worm shaft and the worm wheel, and a plug unit including a plug support formed on a side surface of the cylindrical damper unit, characterized in that a rubber support coupled to a semi-cylindrical damper support formed on one side surface of the damper unit for closing contact between the worm shaft and the worm wheel, and a plug unit including a plug support formed at a lower end of one side surface of the plug unit for coupling with the rubber support and attached to the housing on the other side of the plug unit. This, particularly referring to noise reduction devices including a cylindrical damping unit formed as an elastic member are described.

The Korean document KR1969284B1 describes a noise-reducing type electric power steering comprising the inner wheel member which includes the elastic material, the worm gear which is fixed to the outside of the steering shaft, the worm shaft which engages between the worm gear and returns to the ball of the inner housing, the multiple friction-reducing sliding members which are installed on the outside of the inner wheel member, and the outer wheel member which places the sliding member in the space and it is separated from the inner wheel member. As for the ball of the inner gear, the spline shaft is inserted. This document presents noise reduction arrangements that include an inner gear member containing elastic material.

Publication KR2019123098A comprises a method for reducing yoke backlash noise, wherein the yoke reduces noise by extending the collision time between the rack and pinion due to a partial reduction of initial assistance during steering reversal in the yoke backlash state, also reducing the reduction of assistance at the time when noise occurs. In addition, the method for reducing yoke backlash noise includes performing a yoke backlash condition check in which a steering noise controller detects a yoke backlash noise factor according to the steering, and performing a reverse steering determination is performed following a yoke backlash determination. The basic level of assistance is set according to the amount of steering force required. The basic assist setting reduces the reverse steering noise generated by the yoke play of the rack and pinion bar support device that absorbs the shock of the rack and pinion. The yoke play is determined by one of the yoke play signals, the odometer signal, the shift signal, and the software signal.

Invention U.S. Ser. No. 10/581,974B2 of patent owner Rockwell Automation Technologies, Inc. provides systems and methods for a process having computer-controlled equipment that provides optimized process performance according to one or more performance criteria such as efficiency, component life, safety, emissions, noise, vibration, operating costs, or similar. In particular, the present invention provides for the use of machine diagnostic and/or prognostic information in connection with the optimization of an overall business operation over a time horizon.

According to the state of the art, although there are patents that solve using methods, systems, and a series of gears and related arrangements, none of these solutions in the above mentioned documents has the specific methods and applications of my invention to eliminate the gaseous cavitation, which provides a permanent solution to the noise, vibration, and performance problems of the hydraulic steering system in heavy duty vehicles.

DETAILED DESCRIPTION OF THE INVENTION

Figure 1A:
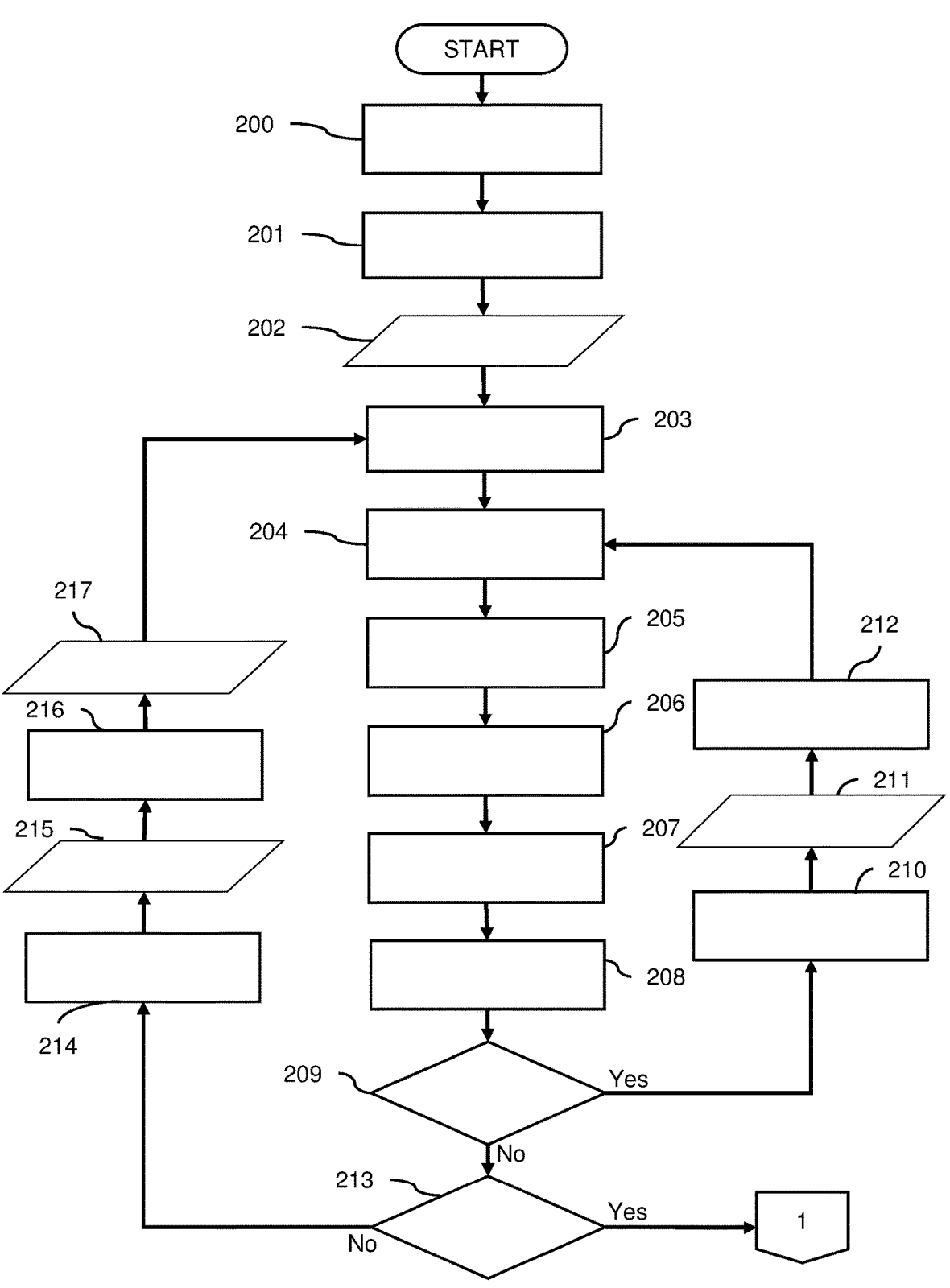
FIG. 1a flow chart illustration of a method and application in accordance with the present invention.
Figure 1B:
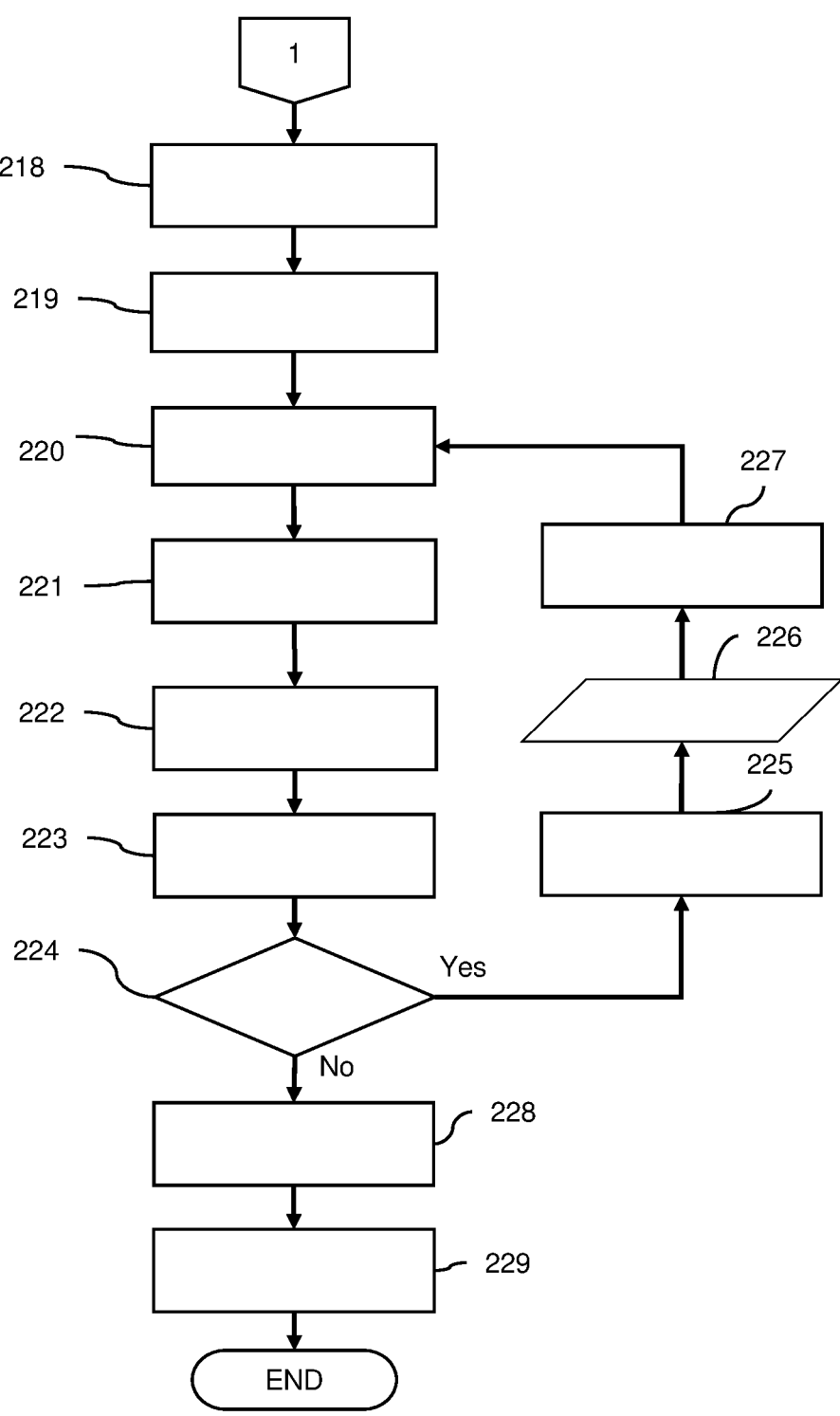
FIG. 1b flow chart illustration of a method and application in accordance with the present invention.

The preferred method, although is not limited (as other variations of the method and application are explained below), is to gradually reduce the RPM of an internal combustion engine with a maximum of 2,500 RPM. The tests were performed by gradually reducing 50 RPM in each test according to the method and application described in the flow chart in FIG. 1a and FIG. 1b. The objective is to eliminate the gaseous cavitation, which causes noise, vibration, the presence of gases, and fluid degradation in the hydraulic steering system on heavy duty vehicles with dual hydraulic steering gearbox. The first step is 200 to measure and establish the current operating conditions of the hydraulic system; the hydraulic fluid, the maximum RPM of the hydraulic pump (Max RPM Test (1)) and the maximum operating temperature of the fluid in the hydraulic system pump (Max Temp Test (1)); once performed 201 the required functionality of the hydraulic system is established, the period of time that the hydraulic system will be kept in operation for each test is predetermined and the means for detecting gaseous cavitation during the tests are established; the method continues with the start of the tests N, T and M, 202 where the first N is equal to one (N=1), the first T is equal to one (T=1), the first M is equal to one (M=1); called 203 Max Temp Test (T), 204 Max RPM Test (N), and 220 Min RPM Test (M); as an important part of the method, 205 a depuration of the system is performed, draining in its entirety the hydraulic fluid and the system is supplied in its entirety with new fluid; in where 206 the system in operation is increased to its maximum RPM (Max RPM Test (N)) of the hydraulic pump, where 207 it is validated that the fluid in the hydraulic system pump is at its maximum operating temperature (Max Temp Test (T)), where 208 the hydraulic system is kept in operation for a predetermined period of time, in 209 evaluates the presence of gaseous cavitation; if the presence of gaseous cavitation is confirmed, 210 the test is stopped 211 and a new N, equal to N plus one (N=N+1), is set; and 212 is set to a new maximum RPM of the hydraulic pump (Max RPM Test (N)), the new maximum RPM will always be lower than the maximum operation of the previous test (Max RPM Test (N−1)); as shown in the flow chart, the test is repeated as many times as necessary until 209 the presence of gaseous cavitation disappears. Once the previous condition has been met, that is to say, once it has been established that the system operates permanently without gaseous cavitation, 213 the development of the hydraulic system is evaluated to see if it meets the required functionality. If the answer is negative, as shown in the diagram, 214 the test is stopped to evaluate the temperature and 215 a new T is established, equal to T plus one (T=T+1); and 216 a temperature reduction technique is selected, implemented and a new maximum operating temperature of the fluid in the hydraulic system pump is set (Max Temp Test (T)). The new maximum operating temperature of the fluid in the hydraulic system pump will always be lower than the maximum operating temperature of the previous test (Max Temp Test (T−1)). The hydraulic pump RPM test is restarted 204 (Max RPM Test (N)), where 217 N equals one (N=1), and the tests are repeated; 204 Max RPM Test (N) and 203 Max Temp Test (T) until 209 there is no gaseous cavitation and 213 the hydraulic system development meets the required functionality.

With the fulfillment of the previous step then 218 the test is stopped, and it is determined that the development of the hydraulic system meets the requirements of functionality, and the hydraulic pump can operate the hydraulic system permanently without gaseous cavitation with the established hydraulic fluid. With a maximum RPM (Max RPM Test (N)) and a maximum operating temperature of the fluid in the hydraulic system pump (Max Temp Test (T)), therefore, the range of compliance of the development of the hydraulic system for the required functionality is determined. This test is called 220 Min RPM Test (M), where 202 M is equal to one (M=1), being 219 Min RPM Test (1) equal to the Max RPM Test (N); where 221 the system in operation is increased to its maximum of RPM (Min RPM Test (M)) of the hydraulic pump, 222 verifying that the fluid in the hydraulic system pump is at the maximum operating temperature (Max Temp Test (T)). 223 The hydraulic system is kept in operation for a preset period of time while 224 it is evaluated whether the evolution of the hydraulic system meets the required functionality. If it does, 225 the test is stopped and 226 a new M is determined, equal to M plus one (M=M+1); and 227 a new maximum hydraulic pump RPM is preset (Min RPM Test (M)), where the new maximum RPM will always be lower than the maximum operation of the previous test (Min RPM Test (M−1)). As shown in the flow chart, the test is repeated until 224 the development of the hydraulic system does not comply with the required functionality, where when it does not comply with the required functionality, 228 the test is stopped, and it is determined that the hydraulic system development meets the required functionality and the hydraulic pump can operate permanently in the hydraulic system without gaseous cavitation with the determined hydraulic fluid. In a maximum range of RPM (Max RPM Test (N)) and minimum RPM (Min RPM Test (M−1)) and with a maximum operating temperature of the fluid in the hydraulic system pump (Max Temp Test (T)).

The above actions constitute the method and its application as seen in the final part of the diagram is as follows; 229 based on the results obtained from this method, a maximum value of RPM of the pump in the hydraulic system is determined and technical modifications are implemented in the pump to meet the RPM, the above using the formulas of transmission of motion ratio, for which a reduction of the RPM is preferably established in a ratio of 2 to a range of 0.5 to 1.9; if, based on the results obtained from this method a new maximum operating temperature value of the fluid in the hydraulic system pump is determined, then the selected temperature reduction technique is implemented.

Figure 2A:
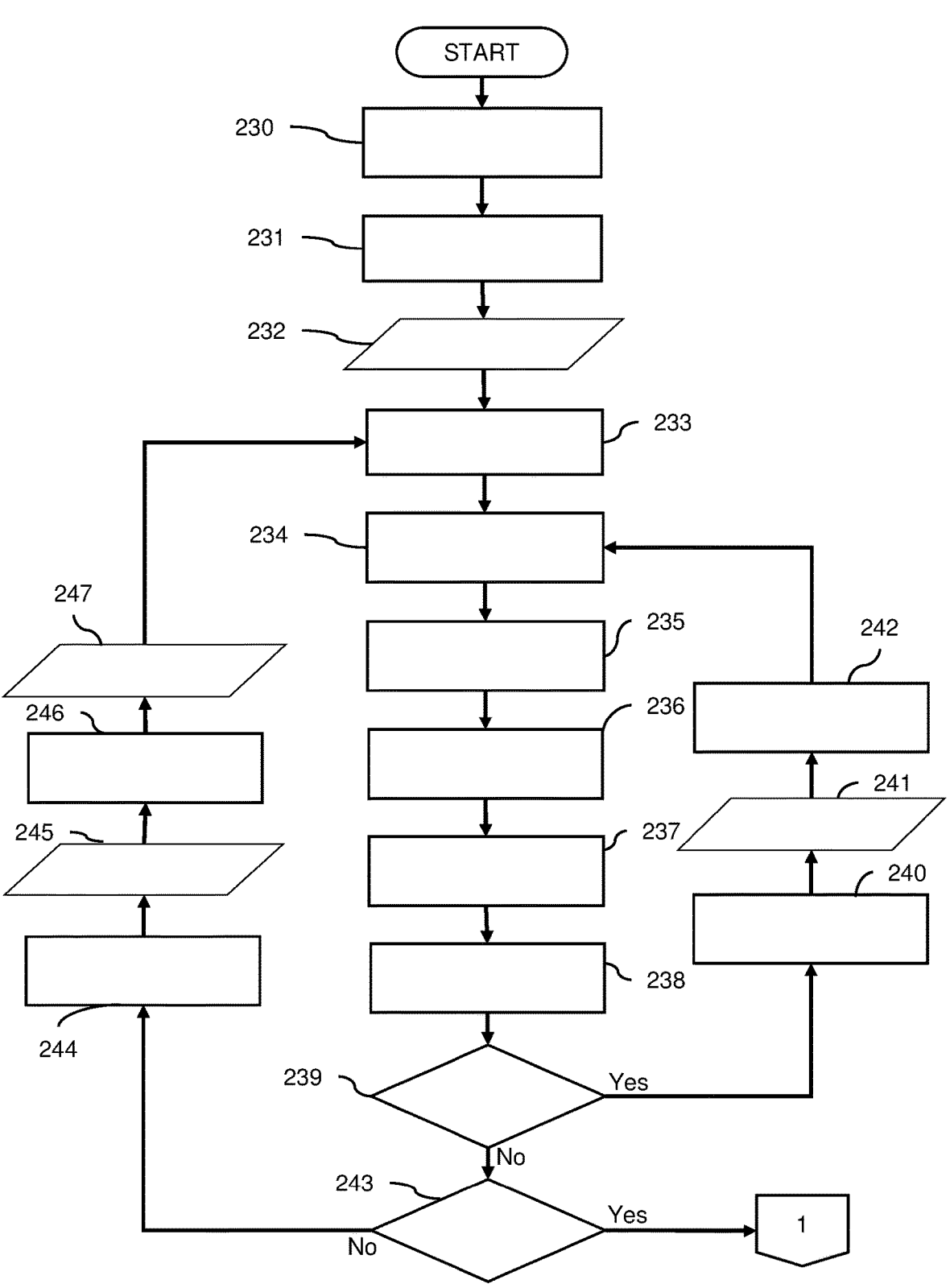
FIG. 2a flow chart illustration of a method and application in accordance with the present invention.
Figure 2B:
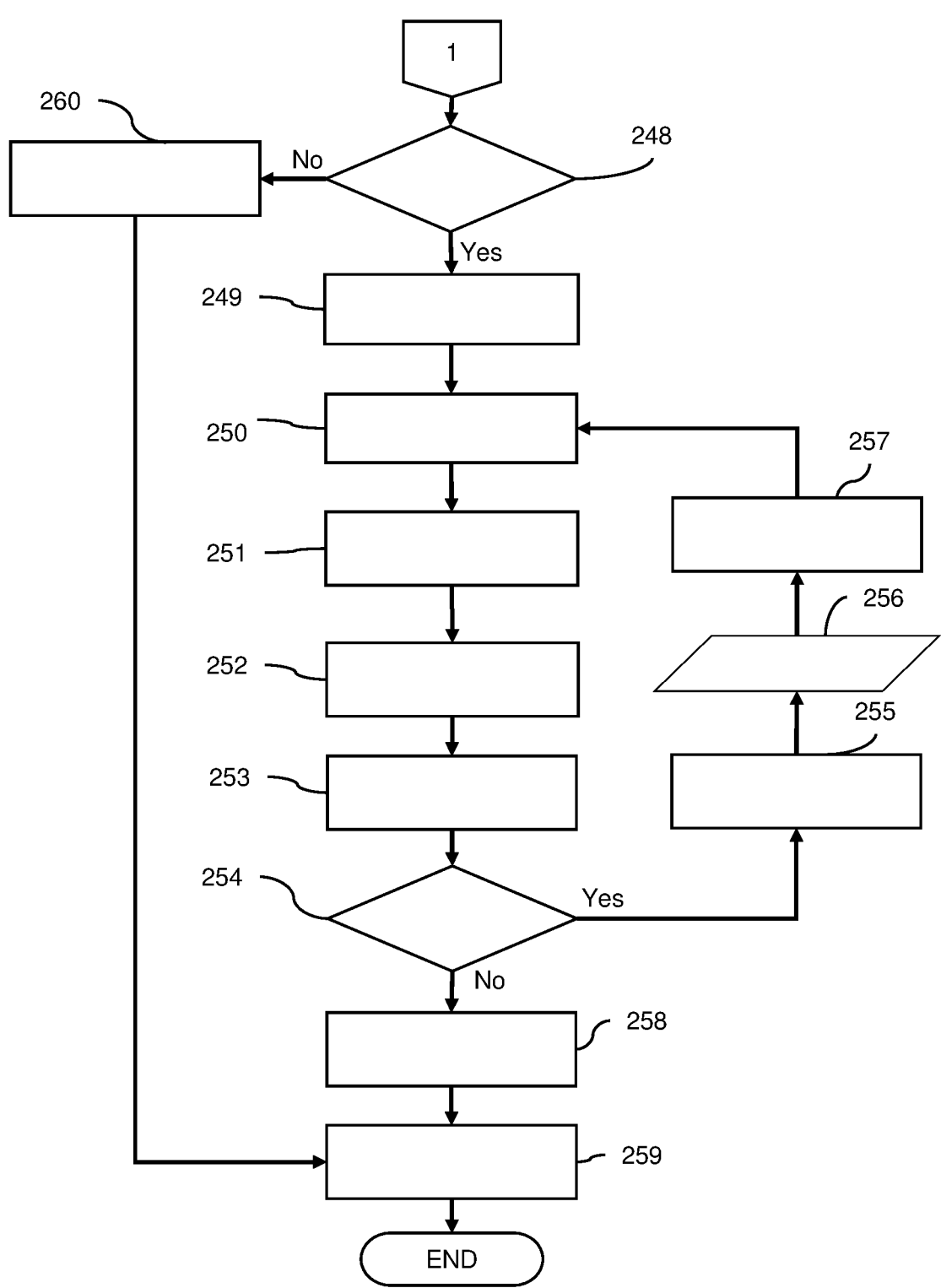
FIG. 2b flow chart illustration of a method and application in accordance with the present invention.

A second method and application is described in the diagram shown in FIG. 2*a* and FIG. 2*b*, which has the objective of eliminating gaseous cavitation where noise, vibration, presence of gases and fluid degradation are present in the hydraulic steering system in heavy duty vehicles with dual hydraulic steering gearbox. The first step is 230 to measure and establish the current operating conditions of the hydraulic system; the hydraulic fluid, the maximum RPM of the hydraulic pump (Max RPM Test (1)) and the maximum operating temperature of the fluid in the hydraulic system pump (Max Temp Test (1)); once performed, 231 the required functionality of the hydraulic system is established, the period of time that the hydraulic system will be kept in operation for each test is predetermined, and the means for detecting gaseous cavitation during the tests are established; the method continues with the start of the tests N, T and G, 232 where the first N is equal to one (N=1), where the first T is equal to one (T=1), where the first G is equal to one (G=1); called 233 Max RPM Test (N), 234 Max Temp Test (T), and 250 Min Temp Test (G); as an important part of the method, 235 a depuration of the system is performed, draining in its entirety the hydraulic fluid and the system is supplied in its entirety with new fluid; wherein 236 the system in operation is increased to its maximum RPM (Max RPM Test (N)) of the hydraulic pump, where 237 it is validated that the fluid in the hydraulic system pump is at its maximum operating temperature (Max Temp Test (T)), 238 operating the hydraulic system for a predetermined period of time, evaluating whether 239 gaseous cavitation is present; wherein, if the presence of gaseous cavitation is confirmed 240, the test is stopped and 241 a new T is established, equal to T plus one (T=T+1); and 242 a temperature reduction technique is selected, implemented and a new maximum operating temperature of the fluid in the hydraulic system pump is predetermined (Max Temp Test (T)), where the new maximum operating temperature of the fluid in the hydraulic system pump will always be lower than the maximum operating temperature of the previous test (Max Temp Test (T−1)); as shown in the diagram, the test will be repeated as many times as necessary until 239 there is no presence of gaseous cavitation; with the previous condition fulfilled, that is to say, once it has been established that the system operates continuously without gaseous cavitation, it will be evaluated whether 243 the evolution of the hydraulic system corresponds to the required functionality; if the answer is negative as shown in the diagram, leads to 244 stopping the test to evaluate the revolutions per minute of the hydraulic pump, and 245 a new N is established, equal to N plus one (N=N+1); and 246 a new maximum RPM of the hydraulic pump is set (Max RPM Test (N)), the new maximum RPM will always being lower than the maximum operation of the previous test (Max RPM Test (N−1)), the maximum operating temperature test of the fluid in the hydraulic system pump is restarted 234 (Max Temp Test (T)), with 247 T equal to one (T=1), where the tests are repeated; 234 Max Temp Test (T) and 233 Max RPM Test (N) until 239 there is no presence of gaseous cavitation and 243 the evolution of the hydraulic system meets the required functionality.

Compliance with the previous step indicates that the system is operating permanently 239 without gaseous cavitation and 243 that development of the hydraulic system is in accordance with the required functionality, therefore proceeding to determine 248 whether or not it is technically possible and necessary to reduce the temperature; if it is technically possible and it is considered necessary to decrease the temperature; being 249 Min Temp Test (1) equal to Max Temp Test (T); we proceed to establish the temperature range with the test, 250 Min Temp Test (G), which starts with 232 G equal to one (G=1); where 251 the system in operation is increased to its maximum RPM (Max RPM Test (N)) of the hydraulic pump, where it is 252 confirmed that the fluid in the hydraulic system pump is at its maximum operating temperature (Min Temp Test (G)), and 253 the hydraulic system is kept in operation for a predetermined period of time, 254 the evolution of the hydraulic system is evaluated as to whether it complies with the required functionality, and if it is technically possible and considered necessary to reduce the temperature, in case all the above 255 is fulfilled, the test is stopped and 256 a new G, equal to G plus one (G=G+1) is established; and 257 a temperature reduction technique is selected, implemented and a new maximum operating temperature of the fluid in the hydraulic system pump is predetermined (Min Temp Test (G)), wherein the new maximum operating temperature of the fluid in the pump of the hydraulic system will always be lower than the maximum operating temperature of the previous test (Min Temp Test (G−1)); as observed in the diagram, the test is repeated until 254 the development of the hydraulic system does not meet with the required functionality and it is not technically possible and it is not considered necessary to reduce the temperature. If any of the above is not complied 258, the test is stopped and it is determined that the development of the hydraulic system meets the required functionality and that the hydraulic pump can operate continuously in the hydraulic system without gaseous cavitation with the hydraulic fluid determined, at a maximum operating temperature of the fluid in the hydraulic system pump (Max Temp Test (T)) and a minimum operating temperature of the fluid in the hydraulic system pump (Min Temp Test (G–1)), and with a maximum RPM (Max RPM Test (N)) of the hydraulic pump in the hydraulic system. In this method result, the application as seen in the last part of the diagram is as follows; 259 based on the results obtained from this method, a maximum operating temperature value of the fluid in the hydraulic system pump is determined and the selected temperature reduction technique is implemented; if based on the results obtained from this method, a new maximum RPM value of the pump in the hydraulic system is determined, then the technical modifications are implemented in the pump to comply with the RPM, the above using the motion ratio transmission formulas, for which a reduction of the RPM is established preferably in a ratio of 2 to a range of 0.5 a 1.9.

However, in the condition where 243 the development of the hydraulic system meets the required functionality, but 248 it is not technically possible and it is not considered necessary to reduce the temperature, 260 the test is stopped and it is determined that the development of the hydraulic system meets the required functionality and the hydraulic pump can operate in the hydraulic system permanently without gaseous cavitation with the determined hydraulic fluid, with a maximum operating temperature of the fluid in the hydraulic system pump (Max Temp Test (T)) and with a maximum RPM (Max RPM Test (N)) of the pump in the hydraulic system. In this result of the condition of the method, the application as seen in the last part of the diagram is as follows; 259 based on the results obtained from this method a maximum value of the operating temperature of the fluid in the pump of the hydraulic system is determined and the selected temperature reduction technique is implemented. If, based on the results obtained from this method, a new maximum RPM value of the pump in the hydraulic system is determined, then the technical modifications are implemented in the pump in order to comply with the RPM. The above using the motion ratio transmission formulas, for which a reduction of the RPM is established preferably in a ratio of 2 to a range of 0.5 a 1.9.

Figure 3A:
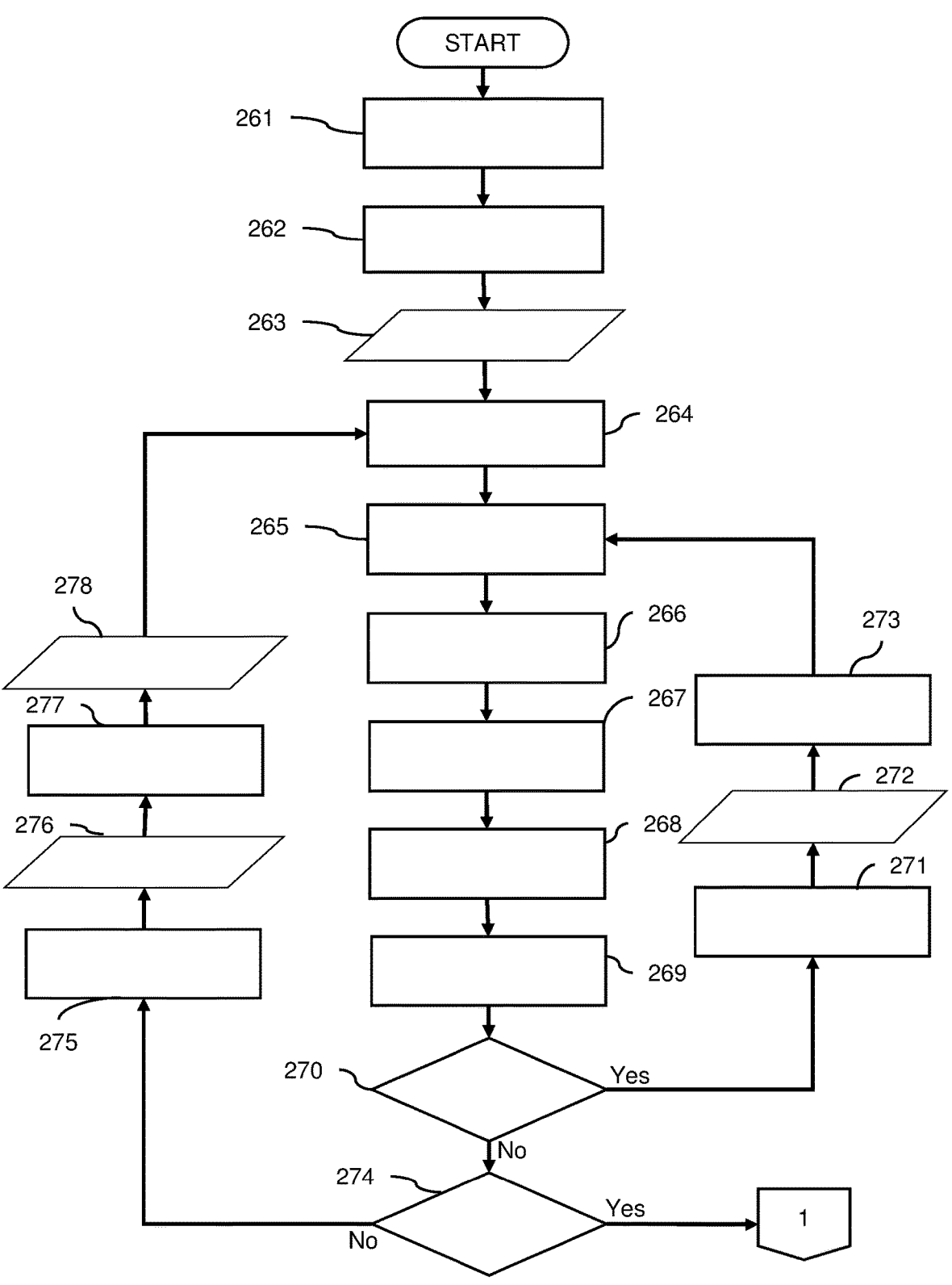
FIG. 3a flow chart illustration of a method and application in accordance with the present invention.
Figure 3B:
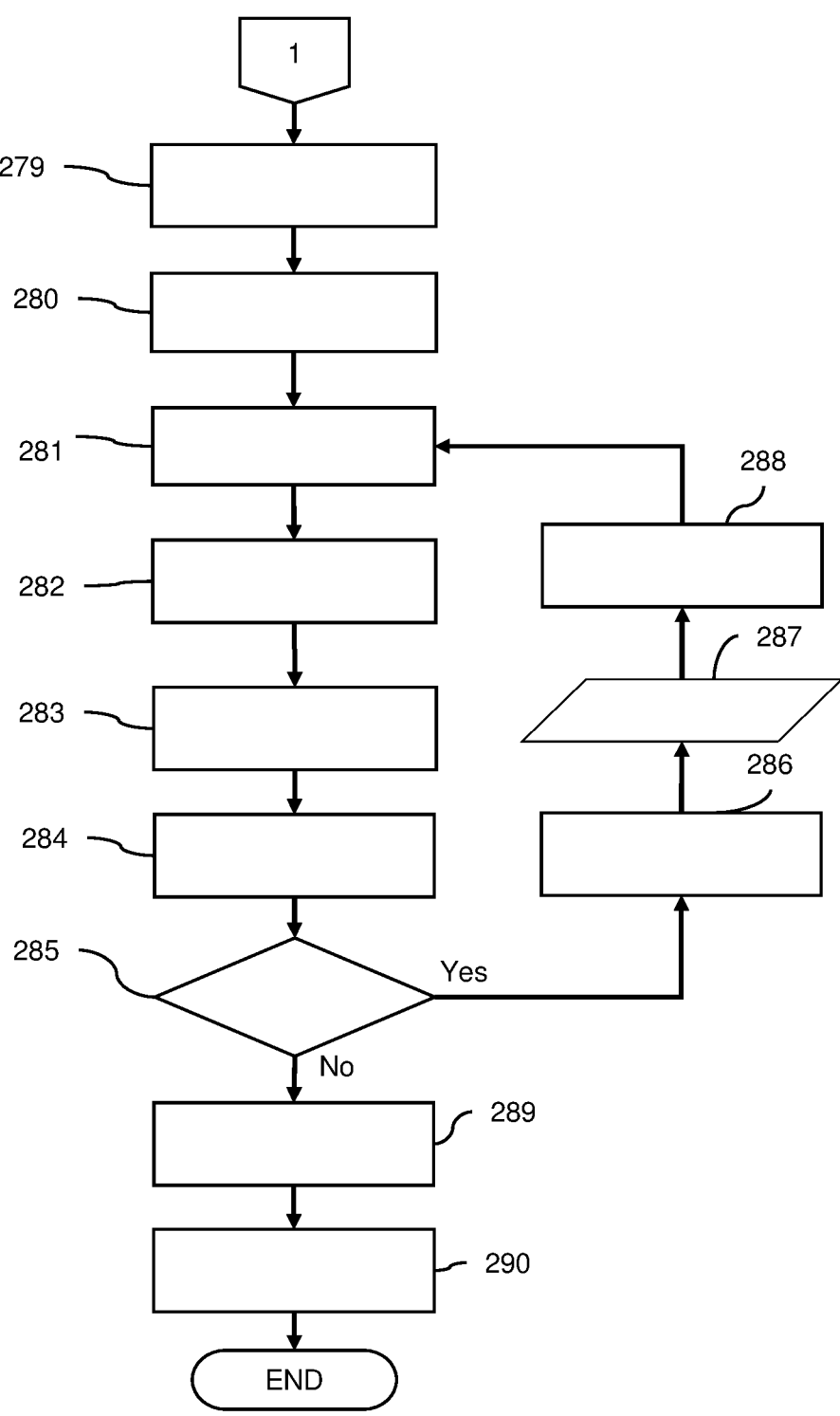
FIG. 3b flow chart illustration of a method and application in accordance with the present invention.

A third method and application is described in the diagram shown in FIG. 3a and FIG. 3b, which has the objective of eliminating gaseous cavitation where noise, vibration, presence of gases and fluid degradation are present in the hydraulic steering system in heavy duty vehicles with dual hydraulic steering gearbox. The first step is 261 to measure and establish the current operating conditions of the hydraulic system; the hydraulic fluid, the maximum flow rate of the hydraulic pump (Max Flow Test (1)) and the maximum operating temperature of the fluid in the hydraulic system pump (Max Temp Test (1)); once performed 262 the required functionality of the hydraulic system is established, the period of time that the hydraulic system will be kept in operation for each test is predetermined and the means for detecting gaseous cavitation during the tests are established; the method continues with the start of tests A, T and B, 263 where the first A is equal to one (A=1), where the first T is equal to one (T=1), where the first B is equal to one (B=1); called 264 Max Temp Test (T), 265 Max Flow Test (A), and 281 Min Flow Test (B); as an important part of the method, 266 a depuration of the system is performed, draining in its entirety the hydraulic fluid and the system is supplied in its entirety with new fluid; where 267 the system in operation is increased to its maximum flow rate of the hydraulic pump (Max Flow Test (A)), where 268 it is validated that the fluid in the hydraulic system pump is at its maximum operating temperature (Max Temp Test (T)), where 269 the hydraulic system is kept in operation for a predetermined period of time, wherein it is evaluated whether 270 the presence of gaseous cavitation is confirmed. If the presence of gaseous cavitation is confirmed 271 the test is stopped and 272 a new A is determined, equal to A plus one (A=A+1); and 273 a new maximum flow rate of the hydraulic pump is predetermined (Max Flow Test (A)), by reducing the RPM of the hydraulic pump, where the new maximum flow rate will always be lower than the maximum operation of the previous test (Max Flow Test (A–1)). As shown in the diagram, the test is repeated as many times as necessary until 270 there is no presence of gaseous cavitation; if the previous condition is fulfilled, that is to say, once it is established that the system is operating continuously without gaseous cavitation, it is proceeded to evaluate whether 274 the evolution of the hydraulic system corresponds to the required functionality; a negative answer, as shown in the diagram, leads to 275 stopping the test to evaluate the temperature and 276 a new T is established, equal to T plus one (T=T+1); and 277 a temperature reduction technique is selected, implemented, and a new maximum operating temperature of the fluid in the hydraulic system pump (Max Temp Test (T)) is predetermined, wherein the new maximum operating temperature of the fluid in the hydraulic system pump will always be lower than the maximum operating temperature of the previous test (Max Temp Test (T–1)), wherein the hydraulic pump 265 flow test is restarted (Max Flow Test (A)), with 278 A equal to one (A=1), wherein the tests are repeated; 265 Max Flow Test (A) and 264 Max Temp Test (T) until 270 does not exist gaseous cavitation and 274 the hydraulic system development meets the required functionality.

With the fulfillment of the previous step then 279 the test is stopped and it is determined that the development of the hydraulic system meets the required functionality and the hydraulic pump can operate in the hydraulic system permanently without gaseous cavitation with the established hydraulic fluid, with a maximum flow rate (Max Flow Test (A)) and with a maximum operating temperature of the fluid in the hydraulic system pump (Max Temp Test (T)), therefore we proceed to determine the range of compliance of the development of the hydraulic system for the required functionality, which begins with 263 B equal to one (B=1), being 280 Min Flow Test (1) equal to the Max Flow Test (A); wherein the test is called 281 Min Flow Test (B), wherein the 282 system in operation is increased to its maximum flow rate of the hydraulic pump (Min Flow Test (B)), wherein 283 it is validated that the fluid in the hydraulic system pump is at its maximum operating temperature (Max Temp Test (T)) and 284 the hydraulic system is kept in operation for a predetermined period of time, 285 the evolution of the hydraulic system is evaluated if it complies with the required functionality, in the case of compliance 286 the test is stopped and 287 a new B is established, equal to B plus one (B=B+1); 288 it is established a new maximum flow rate of the hydraulic pump (Min Flow Test (B)), by reducing the RPM of the hydraulic pump, the new maximum flow rate always being less than the maximum operation of the previous test (Min Flow Test (B–1)); as it is observed in the diagram the test will be repeated until 285 the development of the hydraulic system does not comply with the required functionality, where when it does not comply with the required functionality 289 the test is stopped and it is established that the evolution of the hydraulic system complies with the required functionality and the hydraulic pump can operate in the hydraulic system in a permanent manner without gaseous cavitation with the established hydraulic fluid, in a maximum flow rate range (Max Flow Test (A)) and a minimum flow rate range (Min Flow Test (B−1)) and at with a maximum operating temperature of the fluid in the hydraulic system pump (Max Temp Test (T)).

The previous actions constitute the method and its application as seen in the final part of the diagram, is as follows; 290 based on the results obtained from this method, a maximum value of flow of the pump in the hydraulic system is determined and technical modifications are implemented in the pump to meet the determined flow, through the reduction of the RPM of the hydraulic pump, the above using the formulas of transmission of motion ratio, for which a reduction of the RPM is preferably established in a ratio from 2 to a range of 0.5 to 1.9; if, based on the results obtained from this method a new maximum operating temperature value of the fluid in the hydraulic system pump is determined, then the selected temperature reduction technique is implemented.

Figure 4A:
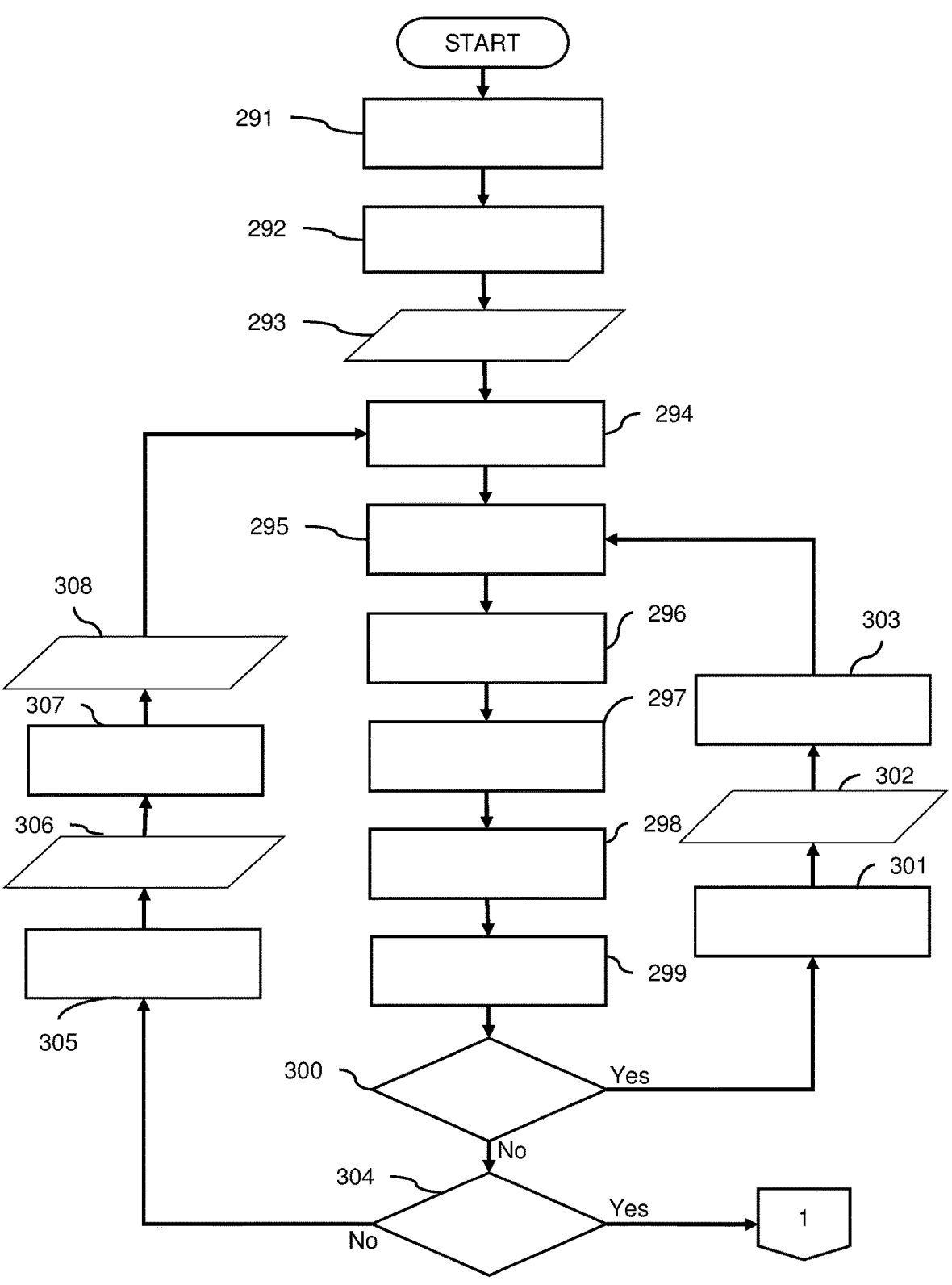
FIG. 4a flow chart illustration of a method and application in accordance with the present invention.
Figure 4B:
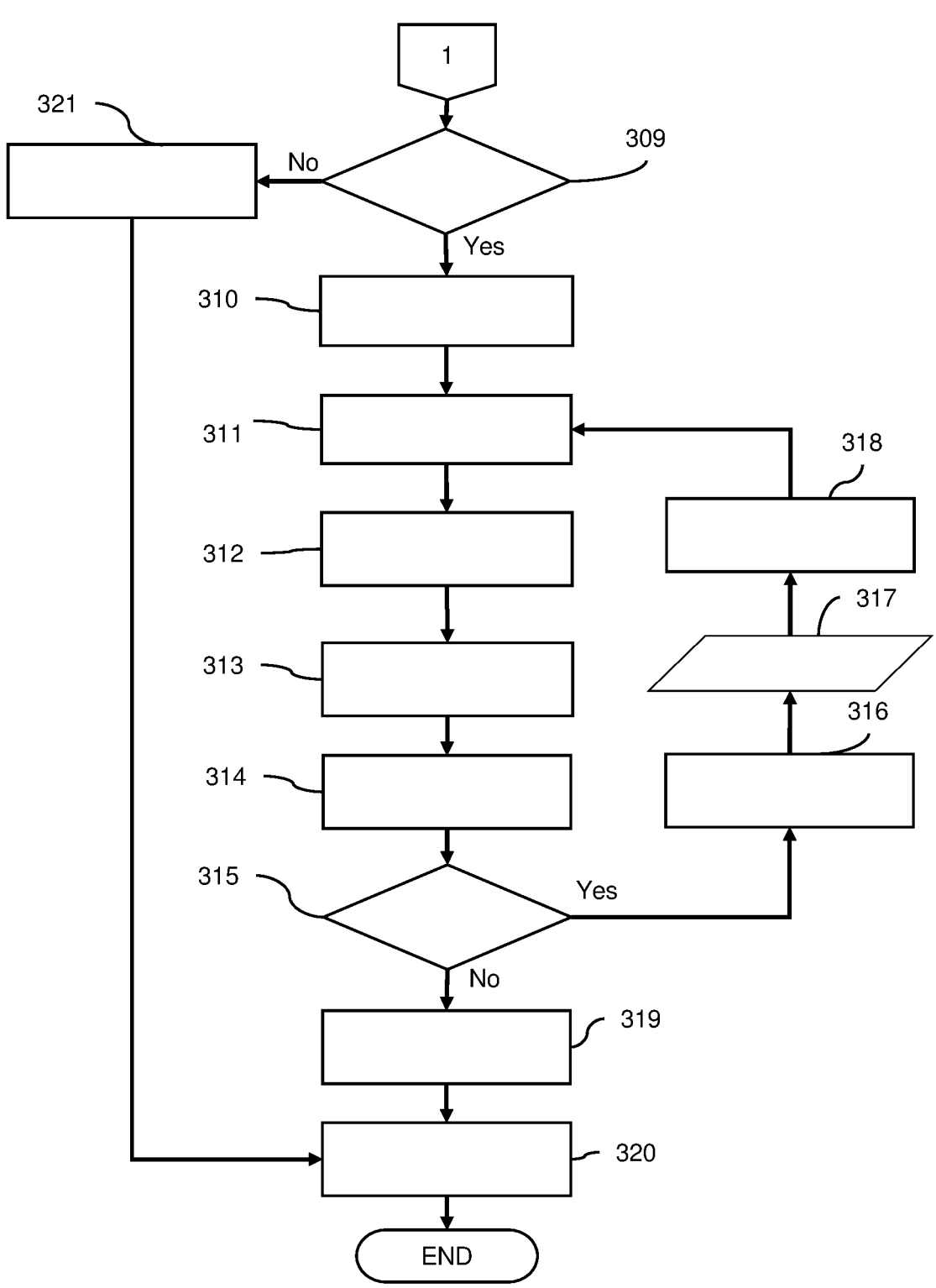
FIG. 4b flow chart illustration of a method and application in accordance with the present invention.

A fourth method and application is described in the diagram shown in FIG. 4*a* and FIG. 4*b*, which has the objective of eliminating gaseous cavitation where noise, vibrations, presence of gases and degradation of the fluid in the hydraulic steering system in heavy duty vehicles with dual hydraulic steering gearbox. The first step is 291 to measure and establish the current operating conditions of the hydraulic system; the hydraulic fluid, the maximum flow rate of the hydraulic pump (Max Flow Test (1)) and the maximum operating temperature of the fluid in the hydraulic system pump (Max Temp Test (1)); once performed 292 the required functionality of the hydraulic system is established, the period of time that the hydraulic system will be kept in operation for each test is predetermined and the means for detecting gaseous cavitation during the tests are established; the method continues with the start of tests A, T and G, 293 where the first A being equal to one (A=1), where the first T is equal to one (T=1), where the first G being equal to one (G=1), called 294 Max Flow Test (A), 295 Max Temp Test (T), and 311 Min Temp Test (G); as an important part of the method, 296 a depuration of the system is performed, draining in its entirety the hydraulic fluid and the system is supplied in its entirety with new fluid; where 297 the system in operation is increased to its maximum flow rate of the hydraulic pump (Max Flow Test (A)), wherein it is 298 validated that the fluid in the hydraulic system pump is at its maximum operating temperature (Max Temp Test (T)), wherein 299 the hydraulic system is kept in operation for a predetermined period of time, wherein it is evaluated if 300 there is presence of gaseous cavitation; wherein if the presence of gaseous cavitation is confirmed, 301 the test is stopped and 302 a new T is established, equal to T plus one (T=T+1); and 303 a temperature reduction technique is selected, implemented and a new maximum operating temperature of the fluid in the hydraulic system pump is predetermined (Max Temp Test (T)), the new maximum operating temperature of the fluid in the hydraulic system pump always being lower than the maximum operating temperature of the previous test (Max Temp Test (T−1)); As shown in the diagram, the test will be repeated as many times as necessary until 300 there is no presence of gaseous cavitation; with the previous condition fulfilled, that is to say, once it is established that the system operates permanently without gaseous cavitation, it is evaluated whether 304 the development of the hydraulic system complies with the required functionality. A negative answer, as shown in the diagram, leads 305 to stop the test to evaluate the flow rate of the hydraulic pump and 306 a new A is established, equal to A plus one (A=A+1); and 307 a new maximum flow rate of the hydraulic pump is predetermined (Max Flow Test (A)), through the reduction of RPM of the hydraulic pump, where the new maximum flow rate will always be lower than the maximum operation of the previous test (Max Flow Test (A−1)), wherein the test of maximum operating temperature of the fluid in the hydraulic system pump 295 (Max Temp Test (T)) is restarted, with 308 T equal to one (T=1), where the tests are repeated; 295 Max Temp Test (T) and 294 Max Flow Test (A) until 300 there is no presence of gaseous cavitation and 304 the evolution of the hydraulic system meets the required functionality.

Compliance with the previous step indicates that the system is operating permanently 300 without gaseous cavitation and 304 that development of the hydraulic system is in accordance with the required functionality, therefore proceeding to determine 309 whether or not it is technically possible and necessary to reduce the temperature; if it is technically possible and it is considered necessary to decrease the temperature; being 310 Min Temp Test (1) equal to Max Temp Test (T); we proceed to establish the temperature range with the test, 311 Min Temp Test (G), which starts with 293 G equal to one (G=1); where 312 the system in operation is increased to its maximum flow rate (Max Flow Test (A)) of the hydraulic pump, where 313 it is confirmed that the fluid in the hydraulic system pump is at its maximum operating temperature (Min Temp Test (G)), and 314 the hydraulic system is kept in operation for a predetermined period of time, 315 the evolution of the hydraulic system is evaluated as to whether it complies with the required functionality, and if it is technically possible and considered necessary to reduce the temperature, in case all the above is fulfilled, 316 the test is stopped and 317 a new G, equal to G plus one (G=G+1) is established; and 318 a temperature reduction technique is selected, implemented and a new maximum operating temperature of the fluid in the hydraulic system pump is predetermined (Min Temp Test (G)), wherein the new maximum operating temperature of the fluid in the pump of the hydraulic system will always be lower than the maximum operating temperature of the previous test (Min Temp Test (G−1)); as observed in the diagram, the test is repeated until 315 the development of the hydraulic system does not meet with the required functionality and it is not technically possible and it is not considered necessary to reduce the temperature. If any of the above is complied 319, the test is stopped and it is determined that the development of the hydraulic system meets the required functionality and that the hydraulic pump can operate continuously in the hydraulic system without gaseous cavitation with the hydraulic fluid determined, at a maximum operating temperature of the fluid in the hydraulic system pump (Max Temp Test (T)) and a minimum operating temperature of the fluid in the hydraulic system pump (Min Temp Test (G−1)), and with a maximum flow rate (Max Flow Test (A)) of the hydraulic pump in the hydraulic system. In this method result, the application as seen in the last part of the diagram is as follows; 320 based on the results obtained from this method, a maximum operating temperature value of the fluid in the hydraulic system pump is determined and the selected temperature reduction technique is implemented; if based on the results obtained from this method, a new maximum flow rate value of the pump in the hydraulic system is determined, then the technical modifications are implemented in the pump to comply with the determined flow rate, through the reduction of the RPM of the hydraulic pump, the above using the motion ratio transmission formulas, for which a reduction of the RPM is established preferably in a ratio of 2 to a range of 0.5 a 1.9.

However, in the condition where 304 the development of the hydraulic system meets the required functionality, but 309 it is not technically possible and it is not considered necessary to reduce the temperature, 321 the test is stopped and it is determined that the development of the hydraulic system meets the required functionality and the hydraulic pump can operate permanently in the hydraulic system without gaseous cavitation with the established hydraulic fluid, with a maximum operating temperature of the fluid in the hydraulic system pump (Max Temp Test (T)) and with a maximum flow rate (Max Flow Test (A)) of the hydraulic pump in the hydraulic system. In this result of the condition of the method, the application as seen in the last part of the diagram is as follows; 320 based on the results obtained from this method a maximum value of the operating temperature of the fluid in the pump of the hydraulic system is determined and the selected temperature reduction technique is implemented. if, based on the results obtained from this method, a new maximum flow rate value of the pump in the hydraulic system is determined, then the technical modifications are implemented in the pump in order to comply with the determined flow rate, through the reduction of the RPM of the hydraulic pump. The above using the motion ratio transmission formulas, for which a reduction of the RPM is established preferably in a ratio of 2 to a range of 0.5 a 1.9.

Figure 5A:
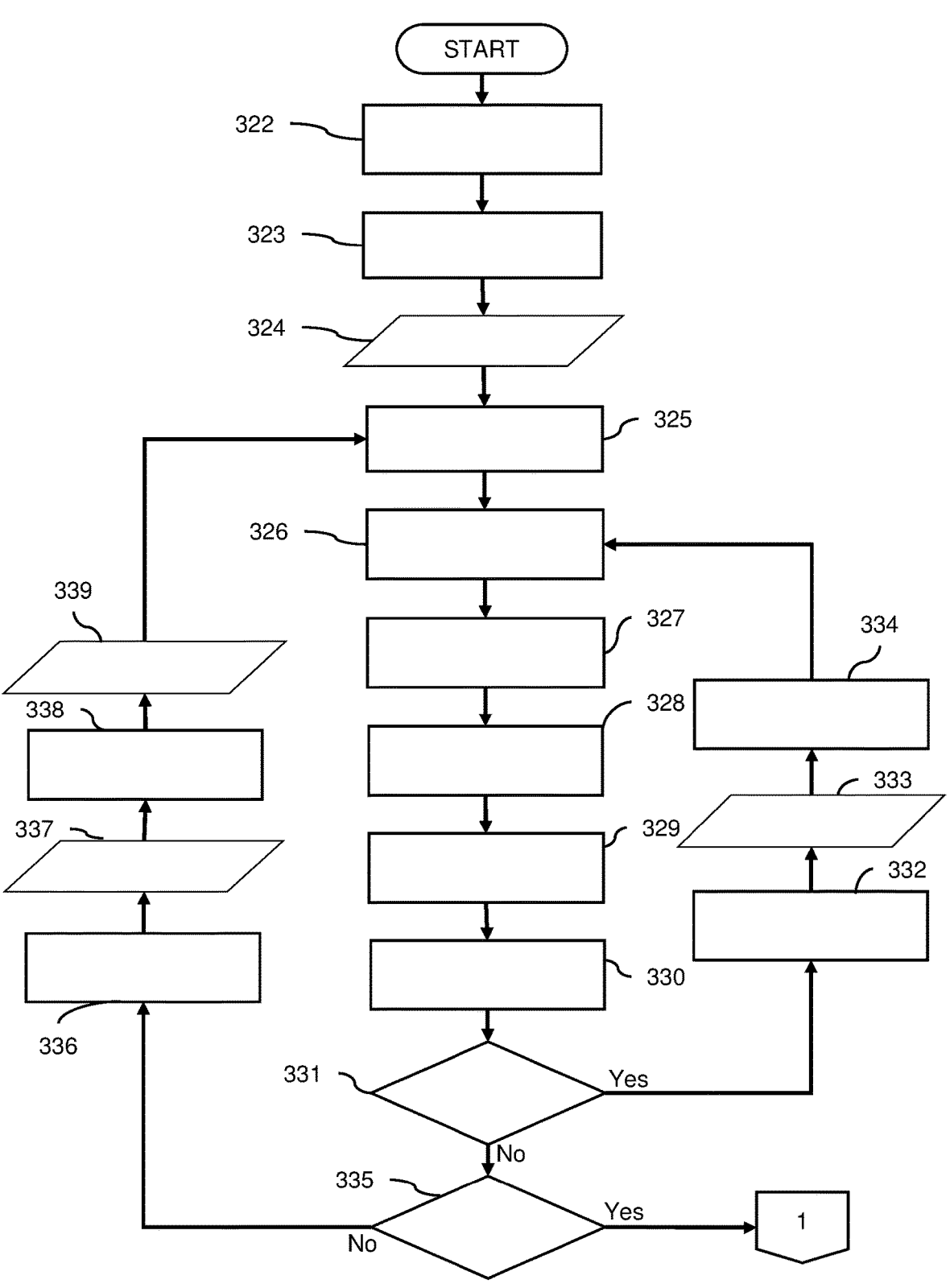
FIG. 5a flow chart illustration of a method and application in accordance with the present invention.
Figure 5B:
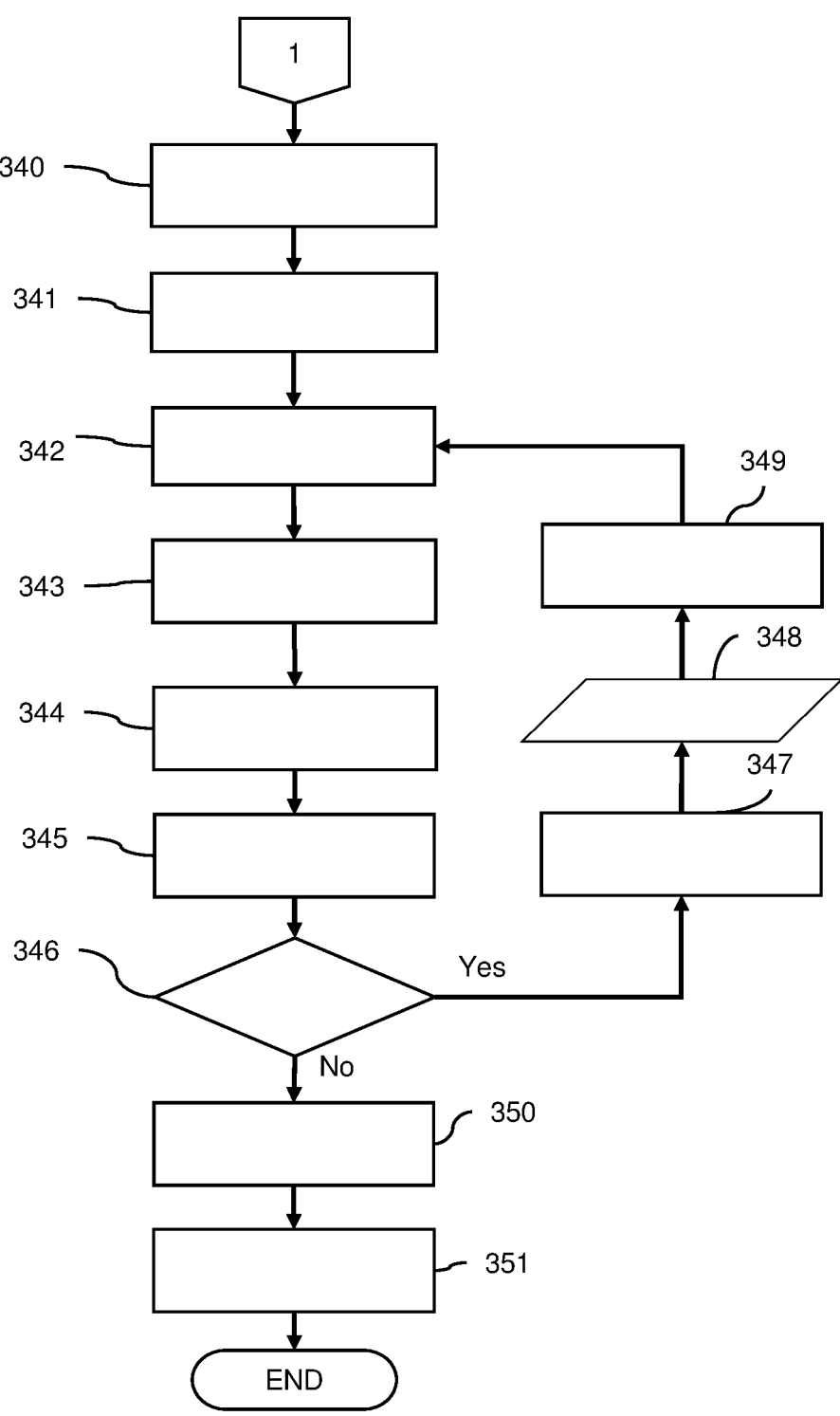
FIG. 5b flow chart illustration of a method and application in accordance with the present invention.

A fifth method and application is described in the diagram shown in FIG. 5*a* and FIG. 5*b*, which has the objective of eliminating gaseous cavitation where noise, vibration, presence of gases and fluid degradation are present in the hydraulic steering system in heavy duty vehicles with dual hydraulic steering gearbox. The first step is 322 to measure and establish the current operating conditions of the hydraulic system; the hydraulic fluid, the maximum Differential Pressure of the hydraulic pump (Max DP Test (1)) and the maximum operating temperature of the fluid in the hydraulic system pump (Max Temp Test (1)); once performed 323 the required functionality of the hydraulic system is established, the period of time that the hydraulic system will be kept in operation for each test is predetermined and the means for detecting gaseous cavitation during the tests are established; the method continues with the start of tests K, T, and L, 324 where the first K is equal to one (K=1), where the first T is equal to one (T=1), where the first L is equal to one (L=1); called 325 Max Temp Test (T), 326 Max DP Test (K), and 342 Min DP Test (L); as an important part of the method, 327 a depuration of the system is performed, wherein the hydraulic fluid is drained in its entirety and the system is supplied in its totality with new fluid; wherein 328 the system in operation is increased to its Differential Pressure of the hydraulic pump (Max DP Test (K)), wherein 329 the fluid in the pump of the hydraulic system is confirmed to be at its maximum operating temperature (Max Temp Test (T)), wherein 330 the hydraulic system is kept in operation for a predetermined period of time, wherein it is evaluated whether 331 the presence of gaseous cavitation is confirmed. If the presence of gaseous cavitation is confirmed 332 the test is stopped and 333 a new K is determined, equal to K plus one (K=K+1); and 334 a new maximum Differential Pressure of the hydraulic pump is predetermined (Max DP Test (K)), by reducing the RPM of the hydraulic pump, where the new maximum Differential Pressure will always be lower than the maximum operation of the previous test (Max DP Test (K−1)). As shown in the diagram, the test is repeated as many times as necessary until 331 there is no presence of gaseous cavitation; if the previous condition is fulfilled, that is to say, once it is established that the system is operating continuously without gaseous cavitation, it is proceeded to evaluate whether 335 the evolution of the hydraulic system corresponds to the required functionality. A negative answer, as shown in the diagram, leads to 336 stop the test to evaluate the temperature and 337 a new T is established, equal to T plus one (T=T+1); and 338 a temperature reduction technique is selected, implemented, and a new maximum operating temperature of the fluid in the hydraulic system pump (Max Temp Test (T)) is predetermined, wherein the new maximum operating temperature of the fluid in the hydraulic system pump will always be lower than the maximum operating temperature of the previous test (Max Temp Test (T−1)), where the Differential Pressure test of the hydraulic pump is restarted 326 (Max DP Test (K)), with 339 K equal to one (K=1), wherein the tests are repeated; 326 Max DP Test (K) and 325 Max Temp Test (T) until 331 does not exist gaseous cavitation and 335 the hydraulic system development meets the required functionality.

With the fulfillment of the previous step 340 the test is stopped and it is established that the development of the hydraulic system meets the required functionality and the hydraulic pump can operate in the hydraulic system permanently without gaseous cavitation with the established hydraulic fluid, with a maximum Differential Pressure (Max DP Test (K)) and with a maximum operating temperature of the fluid in the hydraulic system pump (Max Temp Test (T)), therefore we proceed to determine the range of compliance of the development of the hydraulic system for the required functionality, being 341 Min DP Test (1) equal to the Max DP Test (K); where the test is called 342 Min DP Test (L), which starts with 324 L equal to one (L=1), where 343 the system in operation is increased to its maximum Differential Pressure of the hydraulic pump (Min DP Test (L)), where 344 it is validated that the fluid in the hydraulic system pump is at its maximum operating temperature (Max Temp Test (T)) and 345 the hydraulic system is kept in operation for a predetermined period of time, 346 the development of the hydraulic system is evaluated if it complies with the required functionality, in the case of compliance 347 the test is stopped and 348 a new L is established, equal to L plus one (L=L+1), and 349 a new maximum Differential Pressure of the hydraulic pump is predetermined (Min DP Test (L)), through the reduction of RPM of the hydraulic pump, where the new maximum Differential Pressure will always be lower than the maximum operation of the previous test (Min DP Test (L−1)); As it is observed in the diagram the test will be repeated until 346 the development of the hydraulic system does not comply with the required functionality, where when it does not comply with the required functionality 350 the test is stopped and it is established that the development of the hydraulic system complies with the required functionality and the hydraulic pump can operate in the hydraulic system permanently without gaseous cavitation with the established hydraulic fluid, in a maximum range of Differential Pressure (Max DP Test (K)) and minimum of Differential Pressure (Min DP Test (L−1)) and with a maximum operating temperature of the fluid in the hydraulic system pump (Max Temp Test (T)).

The previous actions constitute the method and its application as seen in the final part of the diagram, is as follows; 351 based on the results obtained from this method, a maximum value of Differential Pressure of the pump in the hydraulic system is determined and technical modifications are implemented in the pump to meet the determined Differential Pressure, through the reduction of the RPM of the hydraulic pump, the above using the formulas of transmission of motion ratio, for which a reduction of the RPM is preferably established in a ratio from 2 to a range of 0.5 to 1.9; if, based on the results obtained from this method a new maximum operating temperature value of the fluid in the hydraulic system pump is determined, then the selected temperature reduction technique is implemented.

Figure 6A:
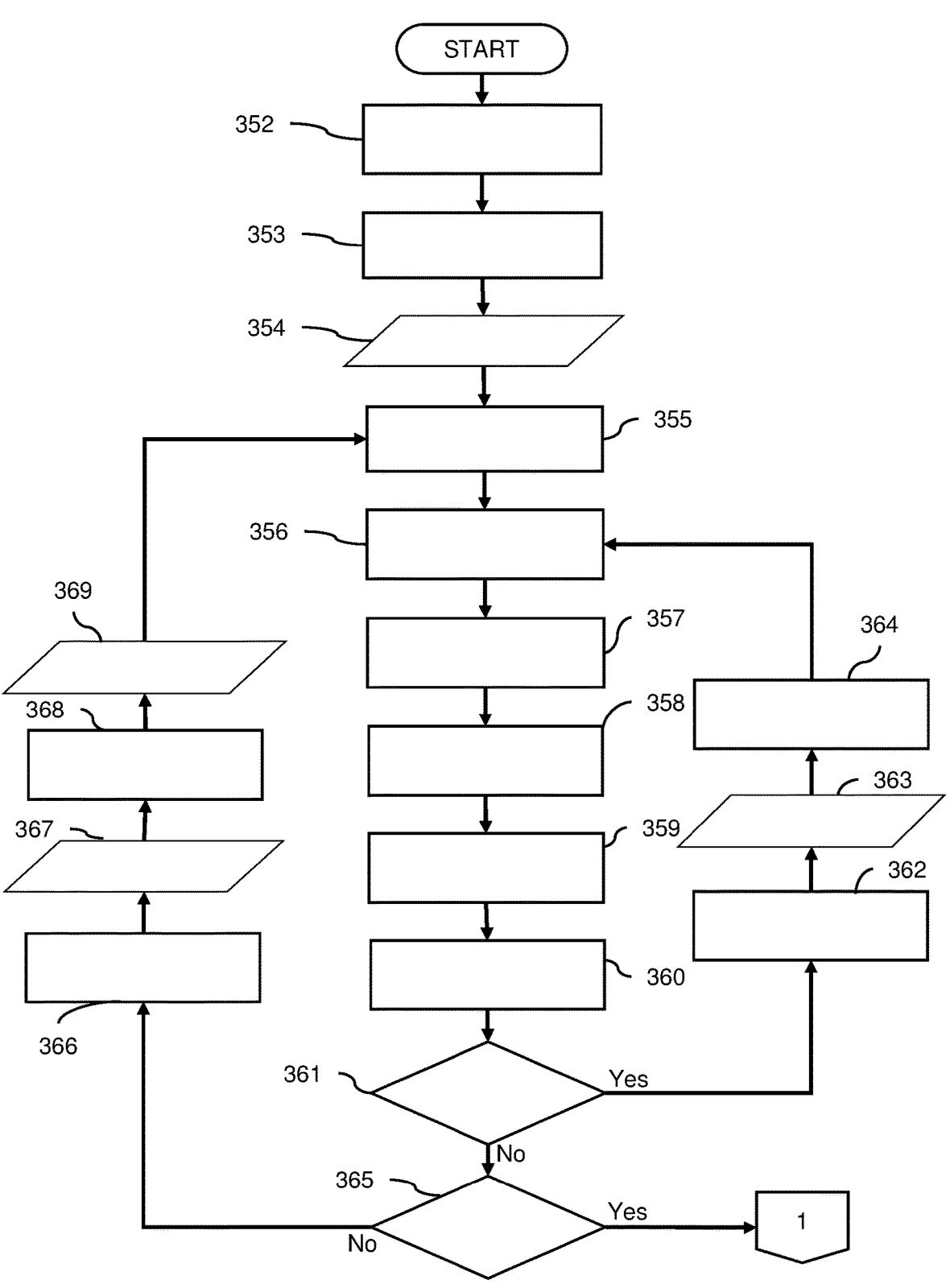
FIG. 6a flow chart illustration of a method and application in accordance with the present invention.
Figure 6B:
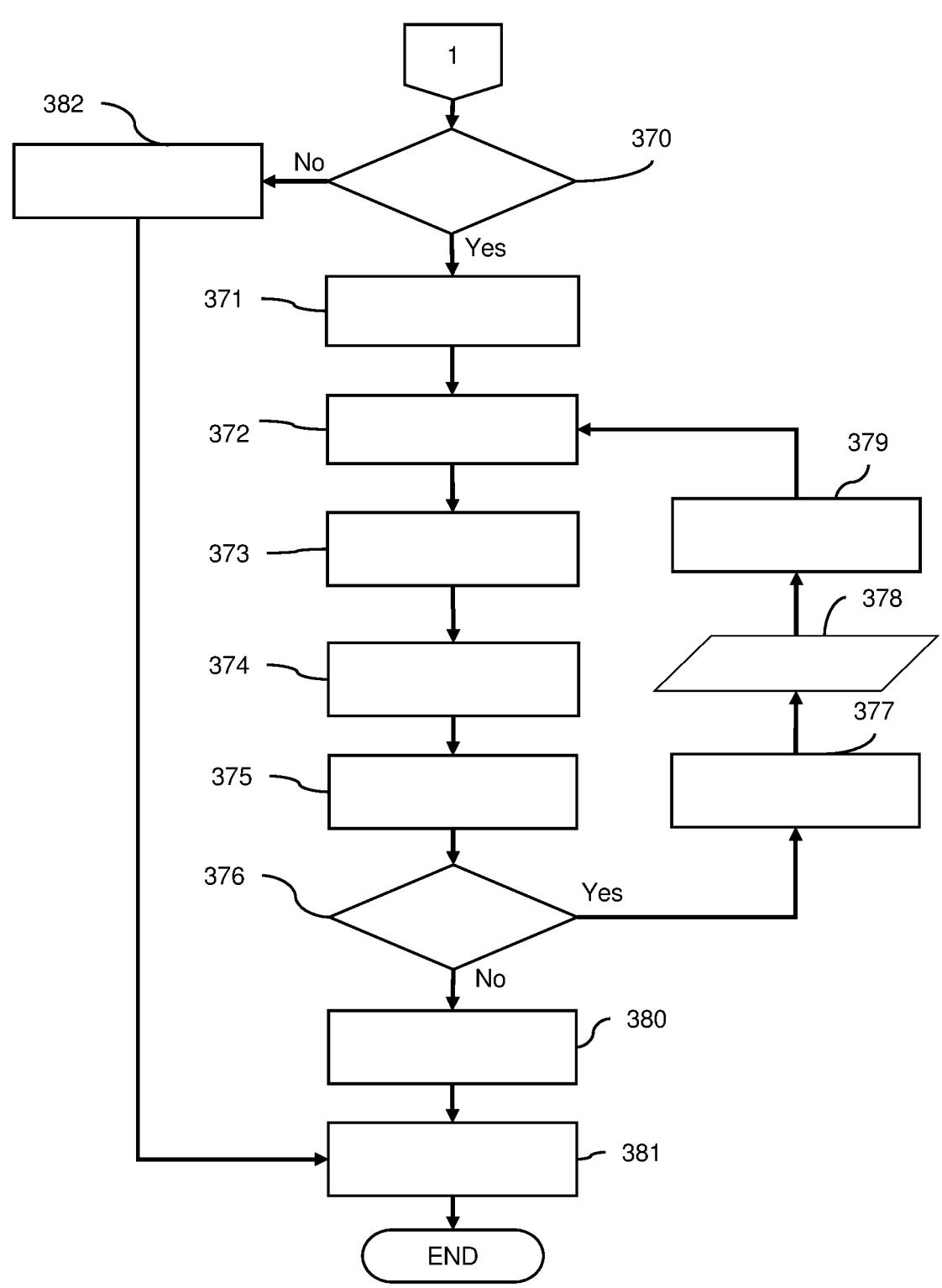
FIG. 6b flow chart illustration of a method and application in accordance with the present invention.

A sixth method and application is described in the diagram shown in FIG. 6a and FIG. 6b, which has the objective of eliminating gaseous cavitation where noise, vibrations, presence of gases and degradation of the fluid in the hydraulic steering system in heavy duty vehicles with dual hydraulic steering gearbox. The first step is 352 to measure and establish the current operating conditions of the hydraulic system; the hydraulic fluid, the maximum Differential Pressure of the hydraulic pump (Max DP Test (1)) and the maximum operating temperature of the fluid in the hydraulic system pump (Max Temp Test (1)); once performed 353 the required functionality of the hydraulic system is established, the period of time that the hydraulic system will be kept in operation for each test is predetermined and the means for detecting gaseous cavitation during the tests are established; the method continues with the start of tests K, T and G, 354 where the first K being equal to one (K=1), where the first T is equal to one (T=1), where the first G being equal to one (G=1), called 355 Max DP Test (K), 356 Max Temp Test (T), and 372 Min Temp Test (G); as an important part of the method, 357 a depuration of the system is performed, draining in its entirety the hydraulic fluid and the system is supplied in its entirety with new fluid; wherein the 358 system in operation is increased to its maximum Differential Pressure of the hydraulic pump (Max DP Test (K)), wherein it is 359 validated that the fluid in the hydraulic system pump is at its maximum operating temperature (Max Temp Test (T)), wherein 360 the hydraulic system is kept in operation for a predetermined period of time, wherein it is evaluated if 361 there is presence of gaseous cavitation; wherein if the presence of gaseous cavitation is confirmed, 362 the test is stopped and 363 a new T is established, equal to T plus one (T=T+1); and 364 a temperature reduction technique is selected, implemented and a new maximum operating temperature of the fluid in the hydraulic system pump is predetermined (Max Temp Test (T)), the new maximum operating temperature of the fluid in the hydraulic system pump always being lower than the maximum operating temperature of the previous test (Max Temp Test (T−1)); As shown in the diagram, the test will be repeated as many times as necessary until 361 there is no presence of gaseous cavitation; with the previous condition fulfilled, that is to say, once it is established that the system operates permanently without gaseous cavitation, it is evaluated whether 365 the development of the hydraulic system complies with the required functionality. A negative answer, as shown in the diagram, leads 366 to stop the test to evaluate the Differential Pressure of the hydraulic pump and 367 a new K is established, equal to K plus one (K=K+1); and 368 a new maximum Differential Pressure of the hydraulic pump is predetermined (Max DP Test (K)), through the reduction of RPM of the hydraulic pump, where the new maximum Differential Pressure will always be lower than the maximum operation of the previous test (Max DP Test (K−1)), wherein the test of maximum operating temperature of the fluid in the hydraulic system pump 356 (Max Temp Test (T)) is restarted, with 369 T equal to one (T=1), where the tests are repeated; 356 Max Temp Test (T) and 355 Max DP Test (K) until 361 there is no presence of gaseous cavitation and 365 the evolution of the hydraulic system meets the required functionality.

Compliance with the previous step indicates that the system is operating permanently 361 without gaseous cavitation and 365 that development of the hydraulic system is in accordance with the required functionality, therefore proceeding to determine 370 whether or not it is technically possible and necessary to reduce the temperature; if it is technically possible and it is considered necessary to decrease the temperature; being 371 Min Temp Test (1) equal to Max Temp Test (T); we proceed to establish the temperature range with the test, 372 Min Temp Test (G), which starts with 354 G equal to one (G=1); where 373 the system in operation is increased to its maximum Differential Pressure (Max DP Test (K)) of the hydraulic pump, 374 where it is confirmed that the fluid in the hydraulic system pump is at its maximum operating temperature (Min Temp Test (G)), and 375 the hydraulic system is kept in operation for a predetermined period of time, 376 the evolution of the hydraulic system is evaluated as to whether it complies with the required functionality, and if it is technically possible and considered necessary to reduce the temperature, in case all the above is fulfilled, 377 the test is stopped and 378 a new G is established, equal to G plus one (G=G+1); and 379 a temperature reduction technique is selected, implemented and a new maximum operating temperature of the fluid in the hydraulic system pump is predetermined (Min Temp Test (G)), wherein the new maximum operating temperature of the fluid in the pump of the hydraulic system will always be lower than the maximum operating temperature of the previous test (Min Temp Test (G−1)); as observed in the diagram, the test is repeated until 376 the development of the hydraulic system meet with the required functionality and it is not technically possible and it is not considered necessary to reduce the temperature. If one of the above is not complied 380, the test is stopped and it is determined that the development of the hydraulic system meets the required functionality and that the hydraulic pump can operate continuously in the hydraulic system without gaseous cavitation with the hydraulic fluid determined, at a maximum operating temperature of the fluid in the hydraulic system pump (Max Temp Test (T)) and a minimum operating temperature of the fluid in the hydraulic system pump (Min Temp Test (G−1)), and with a maximum Differential Pressure (Max DP Test (K)) of the hydraulic pump in the hydraulic system. In this method result, the application as seen in the last part of the diagram is as follows; 381 based on the results, a maximum operating temperature value of the fluid in the hydraulic system pump is determined and the selected temperature reduction technique is implemented; if based on the results obtained from this method, a new maximum Differential Pressure value of the pump in the hydraulic system is determined, then the technical modifications are implemented in the pump in order to comply with the determined Differential Pressure by reducing the RPM of the hydraulic pump, the above using the motion ratio transmission formulas, for which a reduction of the RPM is preferably determined in a ratio of 2 to a range of 0.5 a 1.9.

However, in the condition where 365 the development of the hydraulic system meets the required functionality, but 370 it is not technically possible and it is not considered necessary to reduce the temperature, 382 the test is stopped and it is determined that the development of the hydraulic system meets the required functionality and the hydraulic pump can operate permanently in the hydraulic system without gaseous cavitation with the established hydraulic fluid, with a maximum operating temperature of the fluid in the hydraulic system pump (Max Temp Test (T)) and with a maximum Differential Pressure (Max DP Test (K)) of the hydraulic pump in the hydraulic system. In this result of the condition of the method, the application as seen in the last part of the diagram is as follows; 381 based on the results, a maximum operating temperature value of the fluid in the hydraulic system pump is determined and the selected temperature reduction technique is implemented; if based on the results obtained from this method, a new maximum Differential Pressure value of the pump in the hydraulic system is determined, then the technical modifications are implemented in the pump to comply with the determined Differential Pressure, through the reduction of the RPM of the hydraulic pump, the above using the motion ratio transmission formulas, for which a reduction of the RPM is established preferably in a ratio of 2 to a range of 0.5 a 1.9.

For all the variants of this method described above, as an example, but not limited to, the technical modifications to be implemented in the pump in order to comply with the maximum value of RPM, Flow Rate or Differential Pressure determined by this method are may include, but are not limited to, the following mechanisms to modify the transmission of motion in the pump, gear transmissions between the pump and the motor that provides motion to the pump, gear reducers between the pump and the motor, automatic or manual control of the RPM in an electric motor that provides motion to the pump, gear motors between the pump and the motor that provides motion to the pump, among other implementations and technical modifications to modify the motion and operation of the pump, and thus comply with the maximum value of RPM, Flow Rate or Differential Pressure determined by this method.

Similarly, for all the above described variants of this method, as an example, but not limited to, the technical modifications of temperature reduction to be implemented in the hydraulic system, to meet the maximum operating temperature value of the fluid in the hydraulic system pump determined by this method are: heat dissipation in the components of the hydraulic system, cooling sleeves, cooling systems by means of refrigerating machines, ambient air conditioning systems for the entire hydraulic system, among other implementations and technical modifications to reduce the temperature in the hydraulic system and thus meet with the maximum operating temperature value of the fluid in the hydraulic system pump, determined by this method.

Having described my invention as above, I consider it a novelty and claim ownership of the contents of the following clauses:

The invention claimed is:

1. A method and application for eliminating a gaseous cavitation where a noise, vibrations, gases, and a fluid degradation are present in a hydraulic steering system in heavy duty vehicles with a dual hydraulic steering gearbox, comprising the steps of:

measuring and establishing a current operating conditions of the hydraulic steering system; a hydraulic fluid, a maximum RPM of a hydraulic pump (Max RPM Test (1)) and a maximum operating temperature of a fluid in the hydraulic system pump (Max Temp Test (1)), wherein the required functionality of the hydraulic system is established, a period of time that the hydraulic steering system is kept in operation for each test is predetermined and device for detecting gaseous cavitation during the tests are established, for which tests N, T and M are initiated, Max RPM Test (N), where the first N is equal to one (N=1), Max Temp Test (T), where the first T is equal to one (T=1), and Min RPM Test (M), where the first M is equal to one (M=1), and in which a depuration of the system is performed, draining in its entirety the hydraulic fluid and the system is supplied in its entirety with new fluid, wherein the system in operation is increased to its maximum RPM (Max RPM Test (N)) of the hydraulic pump; wherein it is validated that the fluid in the hydraulic system pump is at its maximum operating temperature (Max Temp Test (T)), where the hydraulic system is kept in operation for a predetermined period of time, where it is evaluated if there is presence of gaseous cavitation, wherein if the presence of gaseous cavitation is confirmed, the test is stopped, and a new N is determined, equal to N plus one (N=N+1), and a new maximum RPM of the hydraulic pump is determined (Max RPM Test (N)); where the new maximum RPM will always be lower than the maximum operation of the previous test (Max RPM Test (N−1)); to then proceed to the next test, where this test is repeated until there is no presence of gaseous cavitation, once it is established that the system operates permanently without gaseous cavitation and also detected that the development of the hydraulic system does not meet the required functionality, the test is stopped to evaluate the temperature and a new T is established, equal to T plus one (T=T+1); and a temperature reduction technique is selected, implemented and a new maximum operating temperature of the fluid in the hydraulic system pump is predetermined (Max Temp Test (T)), wherein the new maximum operating temperature of the fluid in the hydraulic system pump will always be lower than the maximum operation of the previous test (Max Temp Test (T−1)), where the hydraulic pump RPM test is restarted (Max RPM Test (N)), with N equal to one (N=1), where the tests are repeated; Max RPM Test (N) and Max Temp Test (T) until there is no presence of gaseous cavitation and the development of the hydraulic system meets the required functionality, by then and with the fulfillment of the previous step, the test is stopped and it is established that the development of the hydraulic system meets the required functionality and the hydraulic pump can operate in the hydraulic system permanently without gaseous cavitation with the established hydraulic fluid, with a maximum RPM (Max RPM Test (N)) and with a maximum operating temperature of the fluid in the hydraulic system pump (Max Temp Test (T)), determining the range of compliance of the development of the hydraulic system for the required functionality, wherein the test is called Min RPM Test (M), which begins with M equal to one (M=1), being Min RPM Test (1) equal to the Max RPM Test (N);

wherein the system in operation is increased to its maximum RPM (Min RPM Test (M)) of the hydraulic pump, where it is validated that the fluid in the hydraulic system pump is at its maximum operating temperature (Max Temp Test (T)) and the hydraulic system is kept in operation for a predetermined period of time, so if it is confirmed that the evolution of the hydraulic system meets the required functionality, the test is stopped and a new M is established, equal to M plus one (M=M+1); and a new maximum RPM of the hydraulic pump is predetermined (Min RPM Test (M));

where the new maximum RPM will always be lower than the maximum operation of the previous test (Min RPM Test (M−1)), where the test will be repeated until the development of the hydraulic system does not comply with the required functionality, where if it does not comply with the required functionality; the test is stopped and it is established that the development of the hydraulic system complies with the required functionality and the hydraulic pump operates in the hydraulic system permanently without gaseous cavitation with the established hydraulic fluid, in a maximum range of RPM (Max RPM Test (N)) and minimum RPM (Min RPM Test (M−1)) and with a maximum operating temperature of the fluid in the hydraulic system pump (Max Temp Test (T)), wherein based on the results obtained from the method, a maximum value of RPM of the pump in the hydraulic system is determined and the technical modifications are implemented in the pump to comply with the RPM, using the formulas of transmission of motion ratio, for which a reduction of the RPM is established in a ratio of 2 to a range of 0.5 to 1.9;

wherein based on the results obtained from the method a new maximum value of fluid operating temperature in the hydraulic system pump is determined, then the selected temperature decrease technique is implemented.

2. The method according to claim 1, wherein a Min Temp Test (G), the first G being equal to one (G=1), and in which a depuration of the system is performed, draining in its entirety the hydraulic fluid and the system is supplied in its entirety with new fluid, where the system in operation is increased to its maximum RPM (Max RPM Test (N)) of the hydraulic pump, wherein it is confirmed that the fluid in the hydraulic system pump is at its maximum operating temperature (Max Temp Test (T)), wherein the hydraulic system is maintained in operation for a predetermined period of time, wherein it is evaluated whether the presence of gaseous cavitation is confirmed; wherein, if the presence of gaseous cavitation is confirmed, the test is stopped and a new T is established, equal to T plus one (T=T+1) is determined; and a temperature reduction technique is selected, implemented and a new maximum operating temperature of the fluid in the hydraulic system pump is predetermined (Max Temp Test (T)) where the new maximum operating temperature of the fluid in the hydraulic system pump will always be lower than the maximum operating temperature of the previous test (Max Temp Test (T−1)); to then proceed to the next test, where this test is repeated until there is no presence of gaseous cavitation, once it is established that the system is operating permanently without gaseous cavitation and it is also established that the evolution of the hydraulic system does not meet the required functionality, the test is stopped to evaluate the revolutions per minute of the hydraulic pump and a new N is established, equal to N plus one (N=N+1), and a new maximum RPM of the hydraulic pump is predetermined (Max RPM Test (N)), the new maximum RPM always being lower than the maximum operation of the previous test (Max RPM Test (N−1)), the test for the maximum operating temperature of the fluid in the pump of the hydraulic system is restarted (Max Temp Test (T)), T being equal to one (T=1), the tests being repeated; Max Temp Test (T) and Max RPM Test (N) until there is no presence of gaseous cavitation and the evolution of the hydraulic system meets the required functionality, where once it is established that the system is operating permanently without gaseous cavitation and the evolution of the hydraulic system meets the required functionality, we proceed to determine whether or not it is technically possible and necessary to reduce the temperature, if it is technically possible and it is considered necessary to reduce the temperature, we proceed to establish the temperature range with the test; Min Temp Test (G), which starts with G equal to one (G=1), being Min Temp Test (1) equal to Max Temp Test (T); wherein, the system in operation is increased to its maximum RPM (Max RPM Test (N)) of the hydraulic pump, wherein it is verified that the fluid in the hydraulic system pump is at its maximum operating temperature (Min Temp Test (G)), and the hydraulic system is maintained in operation for a predetermined period of time, wherein, if the evolution of the hydraulic system is in accordance with the required functionality, and if it is technically possible and considered necessary to reduce the temperature, the test is stopped and a new G is determined, equal to G plus one (G=G+1), and a temperature reduction technique is selected, implemented and a new maximum operating temperature of the fluid in the hydraulic system pump is predetermined (Min Temp Test (G)); the new maximum operating temperature of the fluid in the pump of the hydraulic system always being lower than the maximum operating temperature of the previous test (Min Temp Test (G−1)), the test being repeated until the development of the hydraulic system does not meet the required functionality and it is not technically possible and it is not considered necessary to reduce the temperature, where, if any of the above conditions is not met, the test is stopped and it is determined that the hydraulic system development meets the required functionality and the hydraulic pump can operate continuously in the hydraulic system without gaseous cavitation with the hydraulic fluid determined, with a maximum operating temperature of the fluid in the hydraulic system pump (Max Temp Test (T)) and a minimum operating temperature of the fluid in the hydraulic system pump (Min Temp Test (G−1)) and with a maximum RPM (Max RPM Test (N)) of the hydraulic pump in the hydraulic system; where, and based on the results obtained from this method, a maximum operating temperature value of the fluid in the hydraulic system pump is determined and the selected temperature reduction technique is implemented; if, based on the results obtained from this method, a new maximum RPM value of the pump in the hydraulic system is determined, then the technical modifications are implemented in the pump to comply with the RPM, the above using the motion ratio transmission formulas, for which a reduction of the RPM is determined in a ratio of 2 to a range of 0.5 to 1.9; if the development of the hydraulic system meets the required functionality, but it is not technically possible and it is not considered necessary to reduce the temperature, the test is stopped and it is determined that the development of the hydraulic system meets the required functionality and the hydraulic pump can operate permanently in the hydraulic system without gaseous cavitation with the determined hydraulic fluid, with a maximum operating temperature of the fluid in the hydraulic system pump (Max Temp Test (T)) and with a maximum RPM of the pump in the hydraulic system (Max RPM Test (N)); where, and based on the results obtained from this method, a maximum value of the operating temperature of the fluid in the hydraulic system pump is determined and the selected temperature reduction technique is implemented; if, based on of the results obtained from this method, a new maximum RPM value of the of the pump in the hydraulic system is determined, then the technical modifications are implemented in the pump in order to comply with the RPM, the above using the motion ratio transmission formulas, for which a reduction of the RPM is determined in a ratio of 2 to a range of 0.5 to 1.9.

3. The method according to claim 1, wherein a Min Flow Test (B), where the first B is equal to one (B=1), and in which a depuration of the system is performed, draining in its entirety the hydraulic fluid and the system is supplied in its entirety with new fluid, where the system in operation is increased to its maximum flow rate of the hydraulic pump (Max Flow Test (A)), where it is validated that the fluid in the hydraulic system pump is at its maximum operating temperature (Max Temp Test (T)), where the hydraulic system is kept in operation for a predetermined period of time, where it is evaluated if there is presence of gaseous cavitation; If the presence of gaseous cavitation is confirmed, the test is stopped and a new A is established, equal to A plus one (A=A+1); and a new maximum flow rate of the hydraulic pump is predetermined (Max Flow Test (A)), through the decrease of RPM of the hydraulic pump, where the new maximum flow rate will always be less than the maximum operation of the previous test (Max Flow Test (A−1)), to then proceed to the next test, where this test is repeated until there is no presence of gaseous cavitation, once it is established that the system operates permanently without gaseous cavitation and it is also detected that the development of the hydraulic system does not meet the required functionality, the test is stopped to evaluate the temperature and a new T is established, equal to T plus one (T=T+1); and a temperature decrease technique is selected, implemented and a new maximum operating temperature of the fluid in the hydraulic system pump is predetermined (Max Temp Test (T)), where the new maximum operating temperature of the fluid in the hydraulic system pump will always be lower than the maximum operation of the previous test (Max Temp Test (T−1)), where the hydraulic pump flow rate test is restarted (Max Flow Test (A)), with A equal to one (A=1), where the tests are repeated; Max Flow Test (A) and Max Temp Test (T) until there is no presence of gaseous cavitation and the development of the hydraulic system complies with the required functionality, by then and with the compliance of the previous step, the test is stopped and it is established that the development of the hydraulic system complies with the required functionality and the hydraulic pump can operate in the hydraulic system permanently without gaseous cavitation with the established hydraulic fluid, with a maximum flow rate (Max Flow Test (A)) and with a maximum operating temperature of the fluid in the hydraulic system pump (Max Temp Test (T)), therefore we proceed to determine the range of compliance of the development of the hydraulic system for the required functionality, where the test is called Min Flow Test (B), which begins with B equal to one (B=1), being Min Flow Test (1) equal to the Max Flow Test (A); where the system in operation is increased to its maximum flow rate of the hydraulic pump (Min Flow Test (B)), where it is validated that the fluid in the hydraulic system pump is at its maximum operating temperature (Max Temp Test (T)) and the hydraulic system is kept in operation for a predetermined period of time, so if it is confirmed that the development of the hydraulic system meets the required functionality, the test is stopped and a new B is established, equal to B plus one (B=B+1); and a new maximum flow rate of the hydraulic pump is predetermined (Min Flow Test (B)), through the decrease of RPM of the hydraulic pump; where the new maximum flow rate will always be less than the maximum operation of the previous test (Min Flow Test (B−1)); where the test will be repeated until the development of the hydraulic system does not comply with the required functionality, where when it does not comply with the required functionality the test is stopped and it is established that the development of the hydraulic system complies with the required functionality and the hydraulic pump can operate in the hydraulic system permanently without gaseous cavitation with the established hydraulic fluid, in a maximum flow rate range (Max Flow Test (A)) and minimum flow rate range (Min Flow Test (B−1)) and with a maximum operating temperature of the fluid in the hydraulic system pump (Max Temp Test (T)); where and based on the results obtained from this method, a maximum value of flow rate of the pump in the hydraulic system is determined and the technical modifications are implemented in the pump to comply with the determined flow rate, through the decrease of RPM of the hydraulic pump, the above using the formulas of transmission of motion ratio, for which a reduction of the RPM is established in a ratio of 2 to a range of 0.5 to 1.9; if, based on the results obtained from this method a new maximum operating temperature value of the fluid in the hydraulic system pump is determined, then the selected temperature decrease technique is implemented.

4. The method according to claim 1, further including the step of: establishing a required functionality of the hydraulic system, the period of time that the hydraulic system will be kept in operation for each test is predetermined and the means to detect gaseous cavitation during the tests are established, for which tests A, T and G are initiated, called; Max Flow Test (A), where the first A is equal to one (A=1), Max Temp Test (T), where the first T is equal to one (T=1), and Min Temp Test (G), where the first G is equal to one (G=1), and in which a depuration of the system is performed, draining in its entirety the hydraulic fluid and the system is supplied in its entirety with new fluid, where the system in operation is increased to its maximum flow rate of the hydraulic pump (Max Flow Test (A)), where it is validated that the fluid in the hydraulic system pump is at its maximum operating temperature (Max Temp Test (T)), where the hydraulic system is kept in operation for a predetermined period of time, where it is evaluated if there is presence of gaseous cavitation; whereby, if the presence of gaseous cavitation is confirmed, the test is stopped and a new T is established, equal to T plus one (T=T+1); and a temperature decrease technique is selected, implemented and a new maximum operating temperature of the fluid in the hydraulic system pump is predetermined (Max Temp Test (T)); where the new maximum operating temperature of the fluid in the hydraulic system pump will always be lower than the maximum operation of the previous test (Max Temp Test (T−1)); to then proceed to the next test, where this test is repeated until there is no presence of gaseous cavitation, once established that the system operates permanently without gaseous cavitation and also detected that the development of the hydraulic system does not meet the required functionality, the test is stopped to evaluate the flow rate of the hydraulic pump and a new A is established, equal to A plus one (A=A+1); and a new maximum flow rate of the hydraulic pump is predetermined (Max Flow Test (A)), through the reduction of RPM of the hydraulic pump, where the new maximum flow rate will always be less than the maximum operation of the previous test (Max Flow Test (A−1)), where the test of maximum operating temperature of the fluid in the hydraulic system pump is restarted (Max Temp Test (T)), with T being equal to one (T=1), where the tests are repeated; Max Temp Test (T) and Max Flow Test (A) until there is no presence of gaseous cavitation and the development of the hydraulic system meets the required functionality, where once established that the system operates permanently without gaseous cavitation and the development of the hydraulic system meets the required functionality, we proceed to determine whether or not it is technically possible and necessary to decrease the temperature, if it is technically possible and it is considered necessary to decrease the temperature, we proceed to establish the temperature range with the test; Min Temp Test (G), which starts with G equal to one (G=1), being Min Temp Test (1) equal to Max Temp Test (T); where the system in operation is increased to its maximum flow rate of the hydraulic pump (Max Flow Test (A)), where it is validated that the fluid in the hydraulic system pump is at its maximum operating temperature (Min Temp Test (G)), and the hydraulic system is kept in operation for a predetermined period of time, where if the development of the hydraulic system complies with the required functionality, and if it is technically possible and it is considered necessary to decrease the temperature, the test is stopped and a new G is established, equal to G plus one (G=G+1); and a temperature decrease technique is selected, implemented and a new maximum operating temperature of the fluid in the hydraulic system pump is predetermined (Min Temp Test (G)), where the new maximum operating temperature of the fluid in the hydraulic system pump will always be lower than the maximum operation of the previous test (Min Temp Test (G−1)), where the test will be repeated until the development of the hydraulic system does not meet the required functionality and it is not technically possible and it is not considered necessary to decrease the temperature, for which upon failure to comply with any of the above, the test is stopped and it is established that the development of the hydraulic system meets the required functionality and the hydraulic pump can operate in the hydraulic system permanently without gaseous cavitation with the established hydraulic fluid, with a maximum operating temperature of the fluid in the hydraulic system pump (Max Temp Test (T)) and a minimum operating temperature of the fluid in the hydraulic system pump (Min Temp Test (G−1)), and with a maximum flow rate (Max Flow Test (A)) of the hydraulic pump in the hydraulic system; where and based on the results obtained from this method, a maximum operating temperature value of the fluid in the hydraulic system pump is determined and the selected temperature decrease technique is implemented; if based on the results obtained from this method, a new maximum value of flow rate of the pump in the hydraulic system is determined, then the technical modifications are implemented in the pump to comply with the determined flow rate, through the decrease of RPM of the hydraulic pump, the above using the formulas of transmission of motion ratio, for which a reduction of the RPM is established in a ratio of 2 to a range of 0.5 to 1.9; if the development of the hydraulic system meets the required functionality but it is not technically possible and it is not considered necessary to decrease the temperature, the test is stopped and it is established that the development of the hydraulic system meets the required functionality and the hydraulic pump can operate in the hydraulic system permanently without gaseous cavitation with the established hydraulic fluid, with a maximum operating temperature of the fluid in the hydraulic system pump (Max Temp Test (T)) and with a maximum flow rate (Max Flow Test (A)) of the hydraulic pump in the hydraulic system; where and based on the results obtained from this method, a maximum value of the operating temperature of the fluid in the hydraulic system pump is determined and the selected temperature decrease technique is implemented; if based on the results obtained from this method, a new maximum value of flow rate of the pump in the hydraulic system is determined, then the technical modifications are implemented in the pump to comply with the determined flow rate, through the decrease of RPM of the hydraulic pump, the above using the formulas of transmission of motion ratio, for which a reduction of the RPM is established in a ratio of 2 to a range of 0.5 to 1.9.

5. The method cording to claim 1, wherein a maximum differential pressure of the hydraulic pump (Max DP Test (1)) and the maximum operating temperature of the fluid in the hydraulic system pump (Max Temp Test (1)), where the required functionality of the hydraulic system is established, the period of time that the hydraulic system will be kept in operation for each test is predetermined and the means to detect gaseous cavitation during the tests are established, for which tests K, T and L are initiated, called; Max DP Test (K), where the first K is equal to one (K=1), Max Temp Test (T), where the first T is equal to one (T=1), and Min DP Test (L), where the first L is equal to one (L=1), and in which a depuration of the system is performed, draining in its entirety the hydraulic fluid and the system is supplied in its entirety with new fluid, where the system in operation is increased to its maximum differential pressure of the hydraulic pump (Max DP Test (K)), where it is validated that the fluid in the hydraulic system pump is at its maximum operating temperature (Max Temp Test (T)), where the hydraulic system is kept in operation for a predetermined period of time, where it is evaluated if there is presence of gaseous cavitation; whereby, if the presence of gaseous cavitation is confirmed, the test is stopped and a new K is established, equal to K plus one (K=K+1) and a new maximum Differential Pressure of the hydraulic pump is predetermined (Max DP Test (K)), through the decrease of RPM of the hydraulic pump; where the new maximum Differential Pressure will always be lower than the maximum operation of the previous test (Max DP Test (K−1)); to then proceed to the next test, where this test is repeated until there is no presence of gaseous cavitation, once established that the system operates permanently without gaseous cavitation and also detected that the development of the hydraulic system does not meet the required functionality, the test is stopped to evaluate the temperature and a new T is established, equal to T plus one (T=T+1); and a temperature decrease technique is selected, implemented and a new maximum operating temperature of the fluid in the hydraulic system pump is predetermined (Max Temp Test (T)), where the new maximum operating temperature of the fluid in the hydraulic system pump will always be lower than the maximum operation of the previous test (Max Temp Test (T−1)), where the Differential Pressure test of the hydraulic pump is restarted (Max DP Test (K)), with K equal to one (K=1), where the tests are repeated; Max DP Test (K) and Max Temp Test (T) until there is no presence of gaseous cavitation and the development of the hydraulic system complies with the required functionality, by then and with the fulfillment of the previous step, the test is stopped and it is established that the development of the hydraulic system complies with the required functionality and the hydraulic pump can operate in the hydraulic system permanently without gaseous cavitation with the established hydraulic fluid, with a maximum Differential Pressure (Max DP Test (K)) and with a maximum operating temperature of the fluid in the hydraulic system pump (Max Temp Test (T)), therefore we proceed to determine the range of compliance of the development of the hydraulic system for the required functionality, where the test is called Min DP Test (L), which begins with L equal to one (L=1), being Min DP Test (1) equal to the Max DP Test (K); where the system in operation is increased to its maximum Differential Pressure of the hydraulic pump (Min DP Test (L)), where it is validated that the fluid in the hydraulic system pump is at its maximum operating temperature (Max Temp Test (T)) and the hydraulic system is kept in operation for a predetermined period of time, so if it is confirmed that the development of the hydraulic system meets the required functionality, the test is stopped and a new L is established, equal to L plus one (L=L+1); and a new maximum Differential Pressure of the hydraulic pump is predetermined (Min DP Test (L)), through the decrease of RPM of the hydraulic pump; where the new maximum Differential Pressure will always be lower than the maximum operation of the previous test (Min DP Test (L−1)); where the test will be repeated until the development of the hydraulic system does not comply with the required functionality, where when it does not comply with the required functionality the test is stopped and it is established that the development of the hydraulic system complies with the required functionality and the hydraulic pump can operate in the hydraulic system permanently without gaseous cavitation with the established hydraulic fluid, in a maximum range of Differential Pressure (Max DP Test (K)) and minimum of Differential Pressure (Min DP Test (L−1)) and with a maximum operating temperature of the fluid in the hydraulic system pump (Max Temp Test (T)); where and based on the results obtained from this method, a maximum value of Differential Pressure of the pump in the hydraulic system is determined and the technical modifications are implemented in the pump to comply with the Differential Pressure determined, through the decrease of RPM of the hydraulic pump, the above using the formulas of transmission of motion ratio, for which a reduction of the RPM is established in a ratio of 2 to a range of 0.5 to 1.9; if, based on the results obtained from this method a new maximum operating temperature value of the fluid in the hydraulic system pump is determined, then the selected temperature decrease technique is implemented.

6. The method according to claim 1, wherein a required functionality of the hydraulic system is established and the period of time that the hydraulic system will be kept in operation for each test is predetermined and the means to detect gaseous cavitation during the tests are established, for which tests K, T and G are initiated, called; Max DP Test (K), where the first K is equal to one (K=1), Max Temp Test (T), where the first T is equal to one (T=1), and Min Temp Test (G), where the first G is equal to one (G=1), and in which a depuration of the system is performed, draining in its entirety the hydraulic fluid and the system is supplied in its entirety with new fluid, where the system in operation is increased to its maximum differential pressure of the hydraulic pump (Max DP Test (K)), where it is validated that the fluid in the hydraulic system pump is at its maximum operating temperature (Max Temp Test (T)), where the hydraulic system is kept in operation for a predetermined period of time, where it is evaluated if there is presence of gaseous cavitation; whereby, if the presence of gaseous cavitation is confirmed, the test is stopped and a new T is established, equal to T plus one (T=T+1); and a temperature decrease technique is selected, implemented and a new maximum operating temperature of the fluid in the hydraulic system pump is predetermined (Max Temp Test (T)); where the new maximum operating temperature of the fluid in the hydraulic system pump will always be lower than the maximum operation of the previous test (Max Temp Test (T−1)); to then proceed to the next test, where this test is repeated until there is no presence of gaseous cavitation, once established that the system operates permanently without gaseous cavitation and also detected that the development of the hydraulic system does not meet the required functionality, the test is stopped to evaluate the differential pressure of the hydraulic pump and a new K is established, equal to K plus one (K=K+1); and a new maximum Differential Pressure of the hydraulic pump is predetermined (Max DP Test (K)), through the decrease of RPM of the hydraulic pump, where the new maximum Differential Pressure will always be lower than the maximum operation of the previous test (Max DP Test (K−1)); where the maximum operating temperature test of the fluid in the hydraulic system pump is restarted (Max Temp Test (T)), with T equal to one (T=1), where the tests are repeated; Max Temp Test (T) and Max DP Test (K) until there is no presence of gaseous cavitation and the development of the hydraulic system meets the required functionality, where once established that the system operates permanently without gaseous cavitation and the development of the hydraulic system meets the required functionality, we proceed to determine whether or not it is technically possible and necessary to decrease the temperature, if it is technically possible and it is considered necessary to decrease the temperature, we proceed to establish the temperature range with the test; Min Temp Test (G), which starts with G equal to one (G=1), being Min Temp Test (1) equal to Max Temp Test (T); where the system in operation is increased to its maximum Differential Pressure of the hydraulic pump (Max DP Test (K)), where it is validated that the fluid in the hydraulic system pump is at its maximum operating temperature (Min Temp Test (G)), and the hydraulic system is kept in operation for a predetermined period of time, where if the development of the hydraulic system complies with the required functionality, and if it is technically possible and it is considered necessary to decrease the temperature, the test is stopped and a new G is established, equal to G plus one (G=G+1); and a temperature decrease technique is selected, implemented and a new maximum operating temperature of the fluid in the hydraulic system pump is predetermined (Min Temp Test (G)), where the new maximum operating temperature of the fluid in the hydraulic system pump will always be lower than the maximum operation of the previous test (Min Temp Test (G−1)), where the test will be repeated until the development of the hydraulic system does not meet the required functionality and it is not technically possible and it is not considered necessary to decrease the temperature, for which upon failure to comply with any of the above, the test is stopped and it is established that the development of the hydraulic system meets the required functionality and the hydraulic pump can operate in the hydraulic system permanently without gaseous cavitation with the established hydraulic fluid, with a maximum operating temperature of the fluid in the hydraulic system pump (Max Temp Test (T)) and a minimum operating temperature of the fluid in the hydraulic system pump (Min Temp Test (G−1)), and with a maximum Differential Pressure (Max DP Test (K)) of the hydraulic pump in the hydraulic system; where and based on the results obtained from this method, a maximum value of the operating temperature of the fluid in the hydraulic system pump is determined and the selected temperature reduction technique is implemented; if based on the results obtained from this method, a new maximum value of Differential Pressure of the pump in the hydraulic system is determined, then the technical modifications are implemented in the pump to comply with the determined Differential Pressure, through the decrease of RPM of the hydraulic pump, the above using the formulas of transmission of motion ratio, for which a reduction of the RPM is established in a ratio of 2 to a range of 0.5 to 1.9; if the development of the hydraulic system meets the required functionality but it is not technically possible and it is not considered necessary to decrease the temperature, the test is stopped and it is established that the development of the hydraulic system meets the required functionality and the hydraulic pump can operate in the hydraulic system permanently without gaseous cavitation with the established hydraulic fluid, with a maximum operating temperature of the fluid in the hydraulic system pump (Max Temp Test (T)) and with a maximum Differential Pressure (Max DP Test (K)) of the hydraulic pump in the hydraulic system; where and based on the results obtained from this method, a maximum value of the operating temperature of the fluid in the hydraulic system pump is determined and the selected temperature reduction technique is implemented; if based on the results obtained from this method, a new maximum value of Differential Pressure of the pump in the hydraulic system is determined, then the technical modifications are implemented in the pump to comply with the determined Differential Pressure, through the decrease of RPM of the hydraulic pump, the above using the formulas of transmission of motion ratio, for which a reduction of the RPM is established in a ratio of 2 to a range of 0.5 to 1.9.

* * * * *